United States Patent
Sudo

(10) Patent No.: US 12,046,264 B2
(45) Date of Patent: Jul. 23, 2024

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Daisuke Sudo, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/184,399

(22) Filed: Mar. 15, 2023

(65) Prior Publication Data

US 2024/0105221 A1    Mar. 28, 2024

(30) Foreign Application Priority Data

Sep. 21, 2022   (JP) ................... 2022-150491

(51) Int. Cl.
    *G11B 5/55*    (2006.01)
(52) U.S. Cl.
    CPC .................. *G11B 5/5547* (2013.01)
(58) Field of Classification Search
    None
    See application file for complete search history.

(56) References Cited

U.S. PATENT DOCUMENTS

| | | | | |
|---|---|---|---|---|
| 5,475,545 | A * | 12/1995 | Hampshire | G11B 5/5547 360/78.07 |
| 5,668,680 | A * | 9/1997 | Tremaine | G11B 5/5547 360/78.07 |
| 6,038,096 | A | 3/2000 | Zhang et al. | |
| 6,140,791 | A * | 10/2000 | Zhang | G11B 21/083 318/632 |
| 6,178,060 | B1 * | 1/2001 | Liu | G11B 5/5565 |
| 6,449,117 | B1 * | 9/2002 | Waugh | G11B 5/5547 360/78.07 |
| 7,110,214 | B1 | 9/2006 | Tu et al. | |
| 9,275,667 | B1 | 3/2016 | Abrishamchian et al. | |
| 2007/0008646 | A1 * | 1/2007 | Lee | G11B 5/5547 |
| 2007/0211371 | A1 * | 9/2007 | Atsumi | G11B 5/5547 360/77.02 |
| 2012/0236432 | A1 * | 9/2012 | Sudo | G11B 5/5547 360/75 |
| 2019/0206437 | A1 * | 7/2019 | Sudo | G11B 19/2063 |

* cited by examiner

*Primary Examiner* — Peter Vincent Agustin
(74) *Attorney, Agent, or Firm* — Kim & Stewart LLP

(57) ABSTRACT

According to one embodiment, a magnetic disk device comprises a JIT seek control unit, which uses second time series data of a current indication value of a VCM that sets a slope having an absolute value smaller than an absolute value of a slope of a first time series data in at least one of a monotonically decreasing interval of an acceleration interval and a monotonically decreasing interval of a deceleration interval of a head or an operation acceleration of the head.

13 Claims, 17 Drawing Sheets

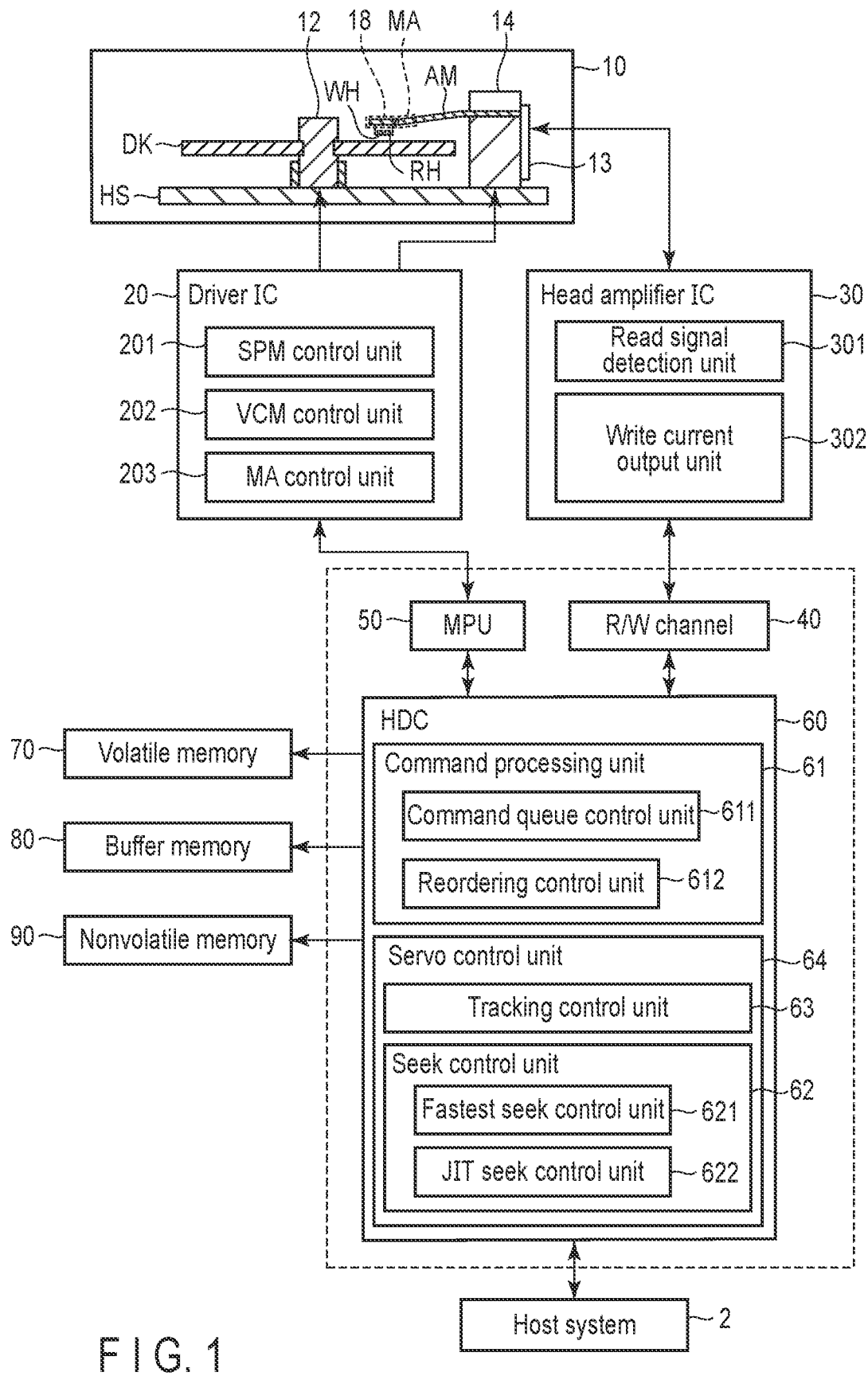
F I G. 1

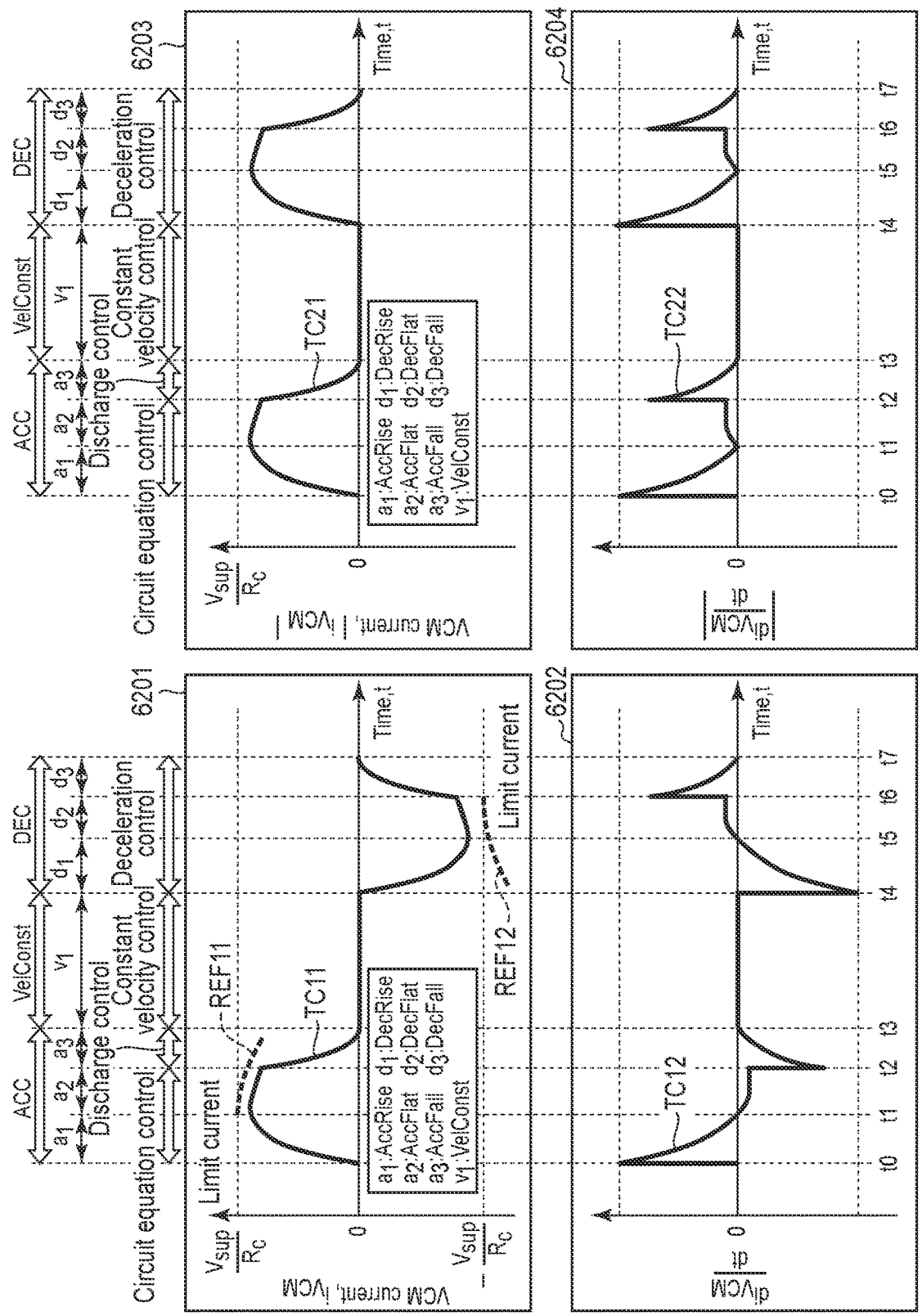
F I G. 3

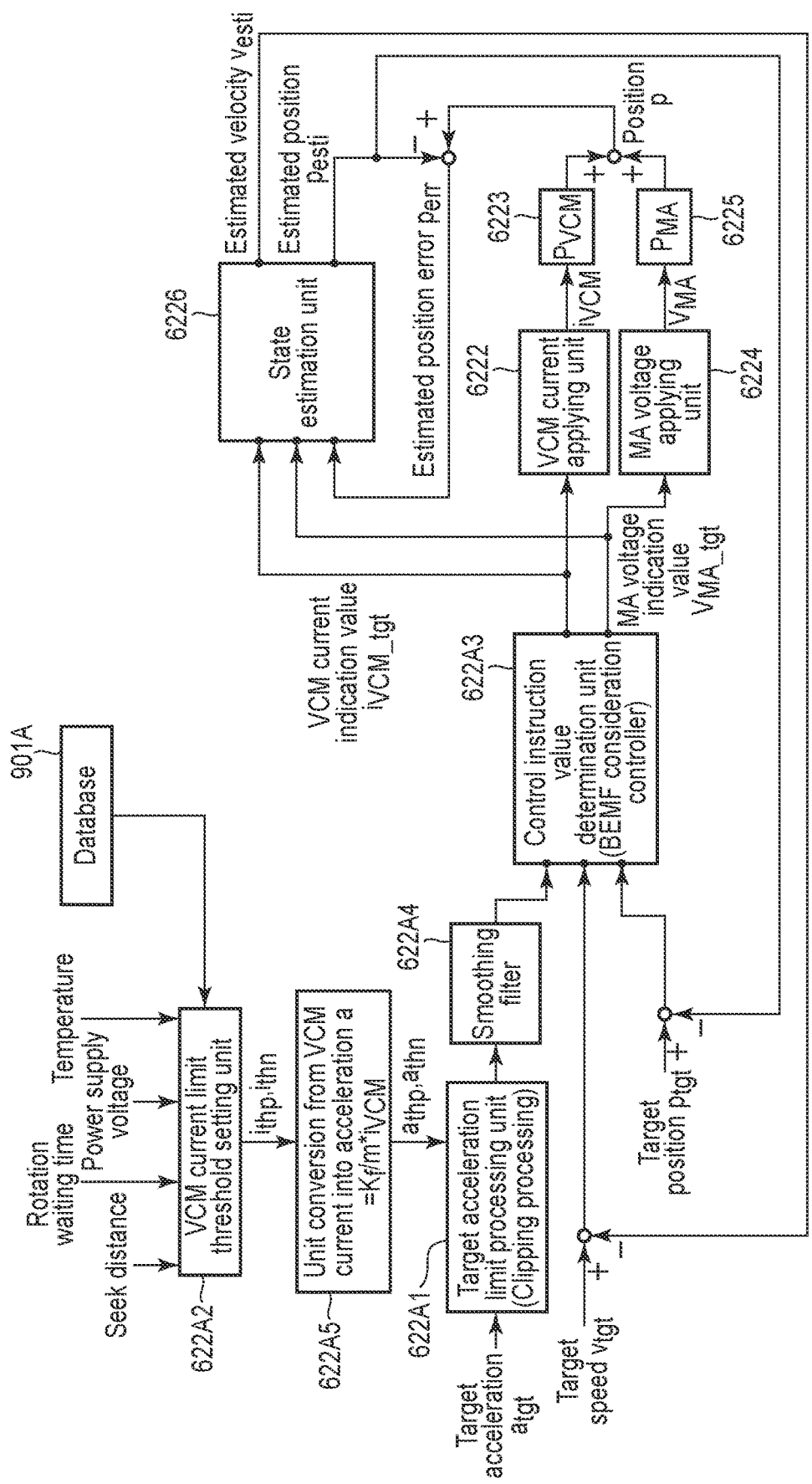
F I G. 8

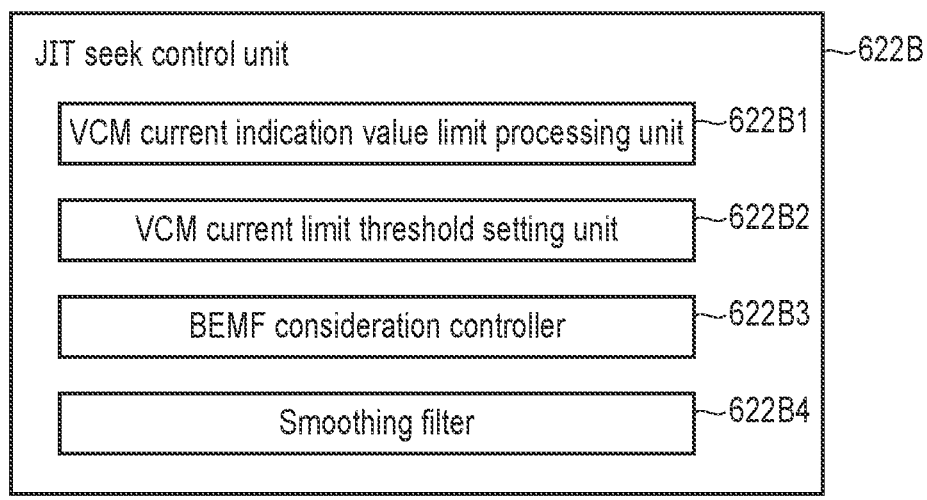
F I G. 9

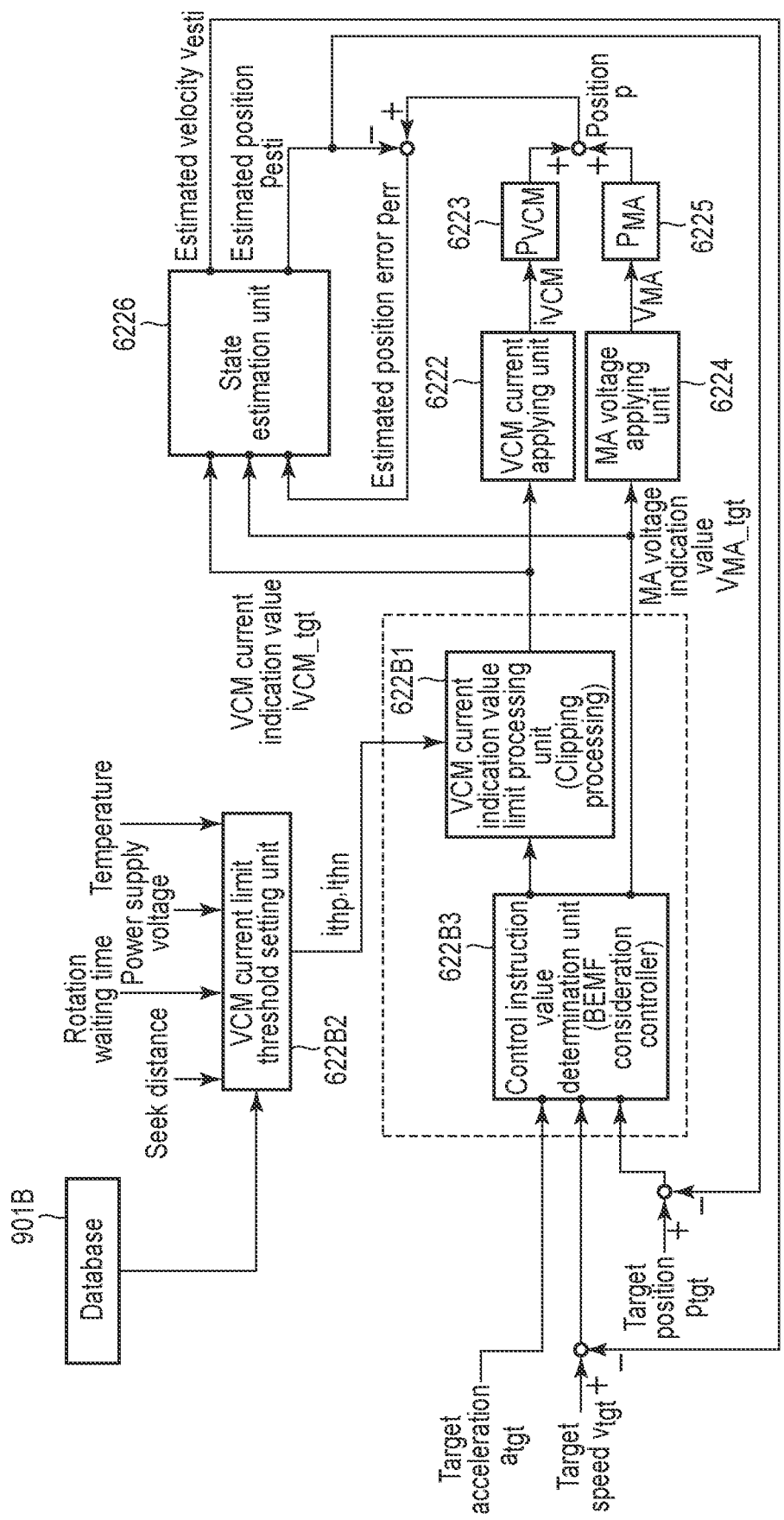
F I G. 10

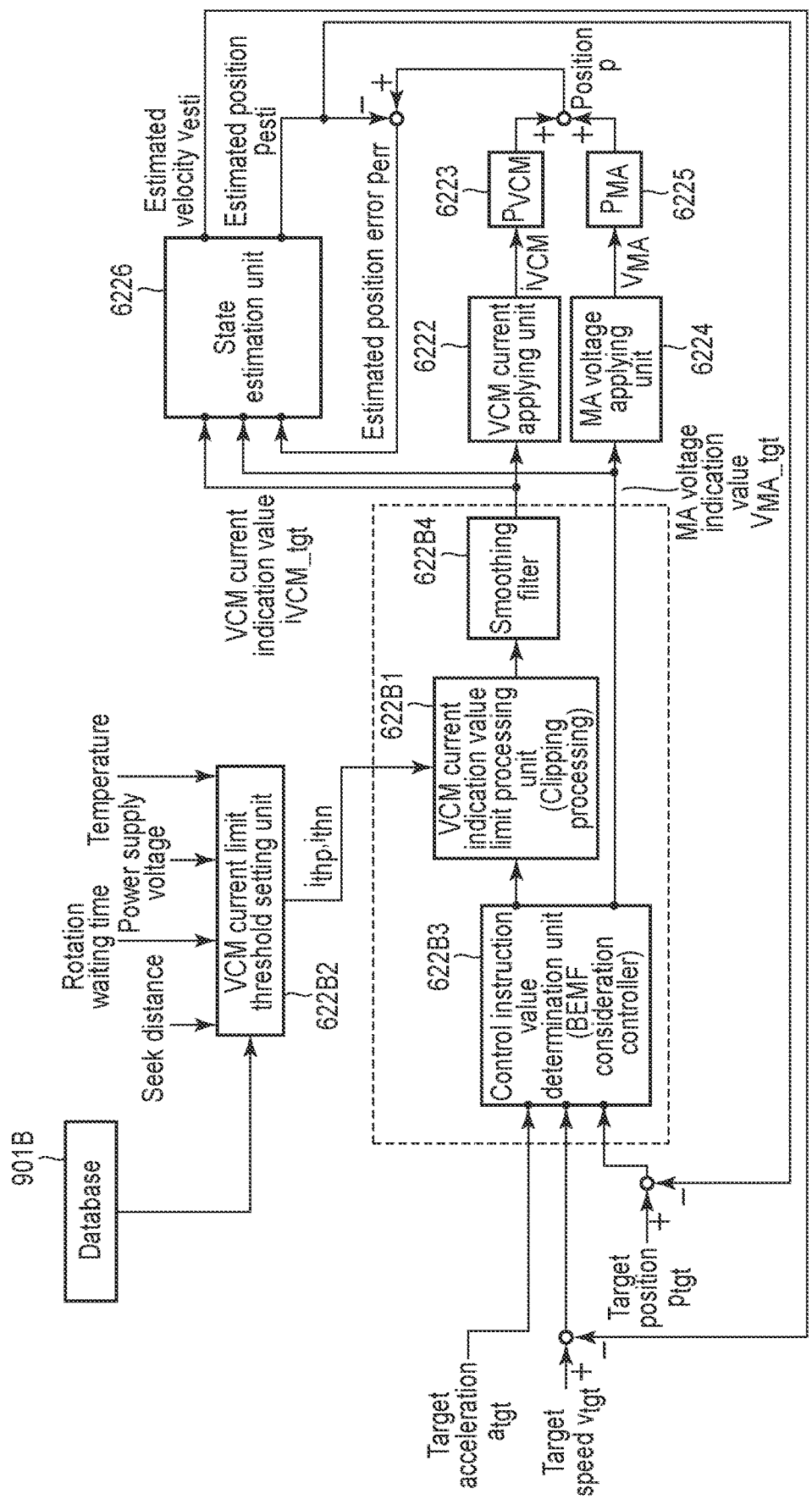
F I G. 11

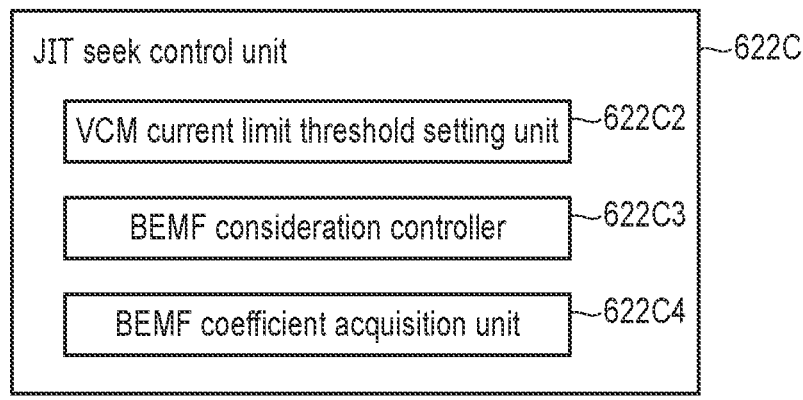
F I G. 12

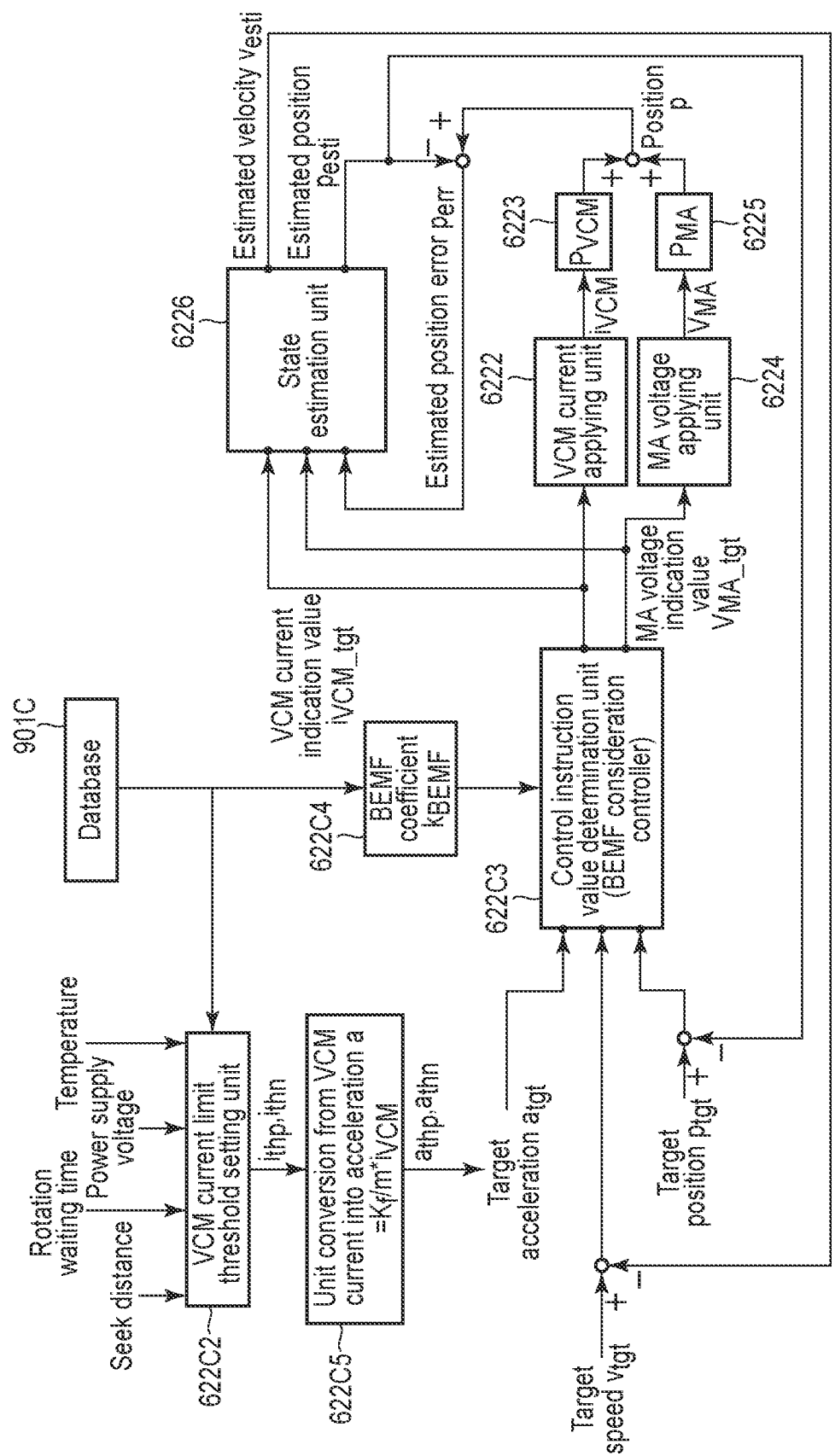
F I G. 13

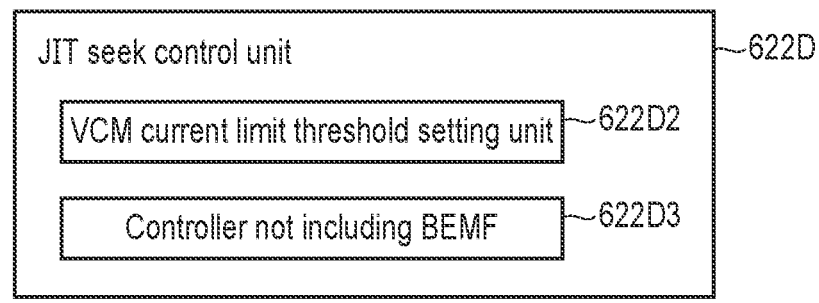
F I G. 14

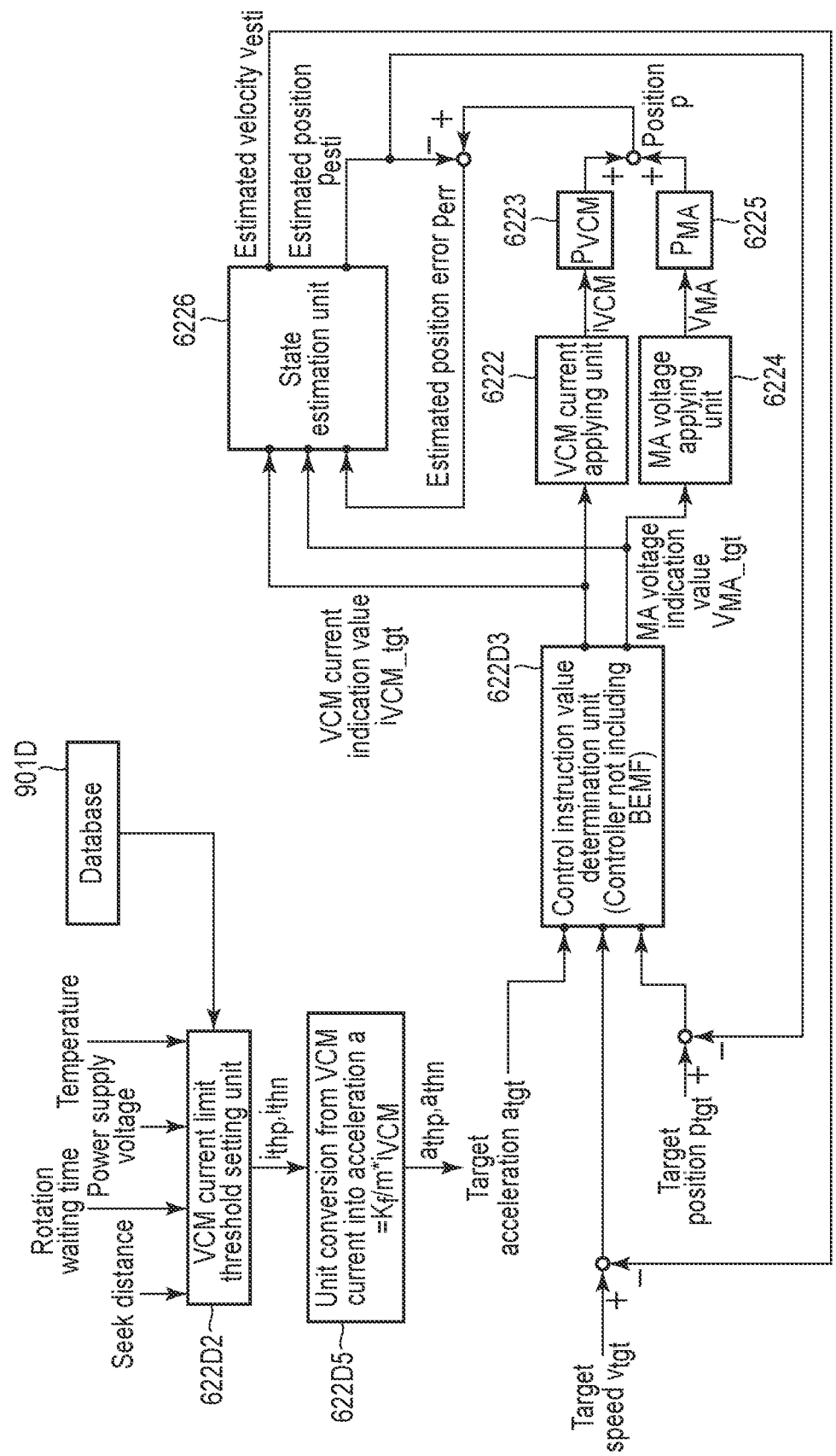
F I G. 15

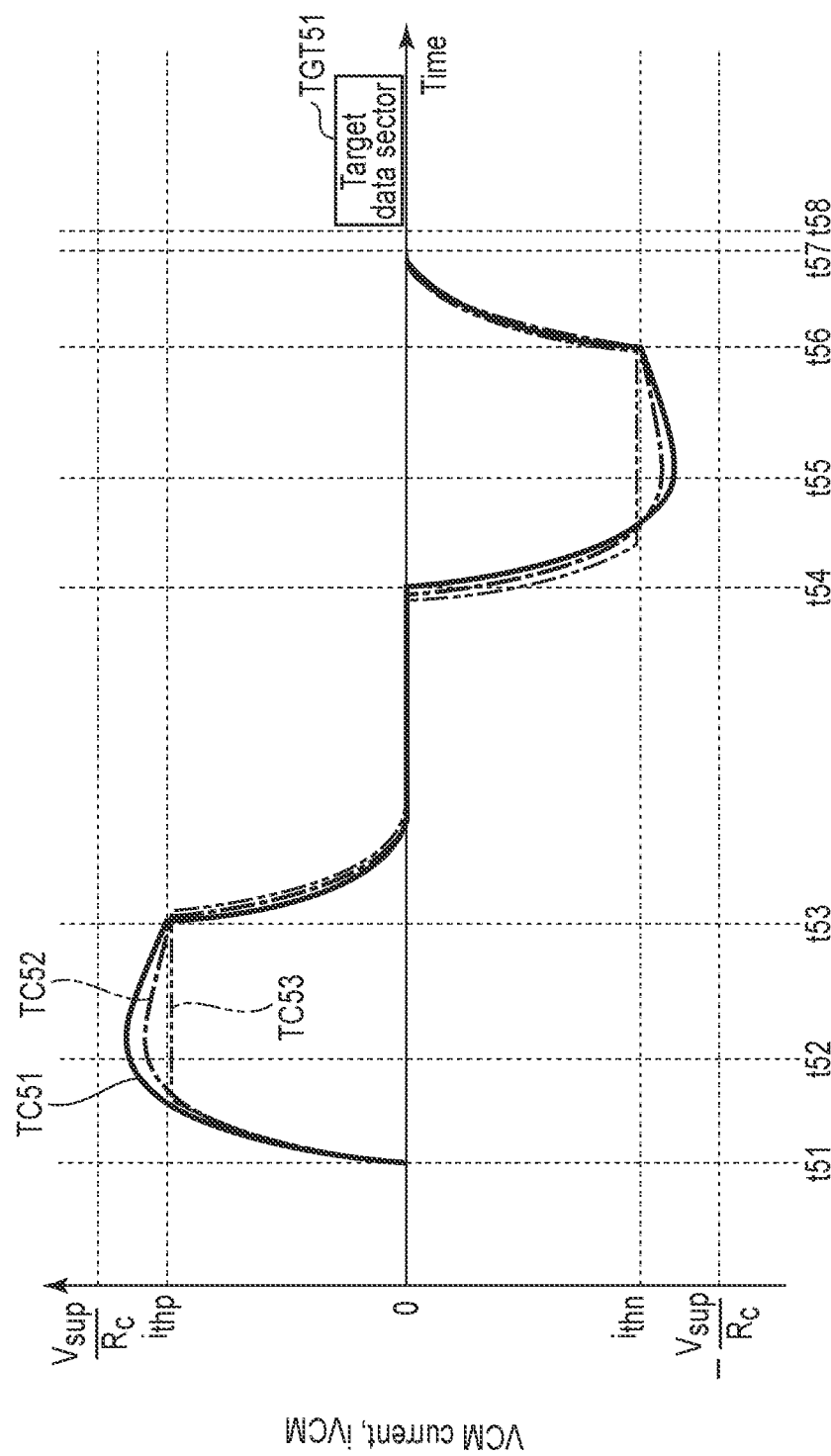
F I G. 16

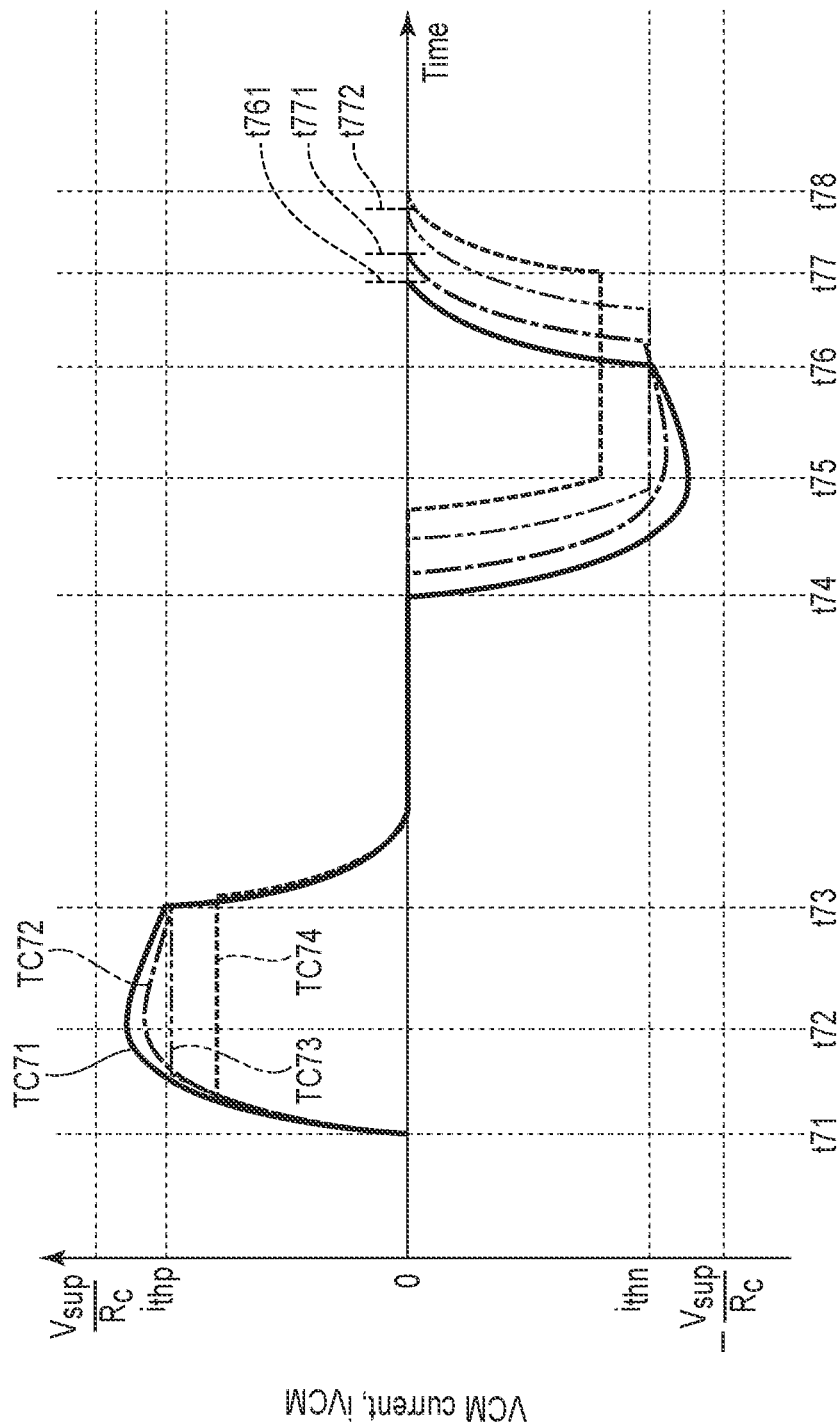
F I G. 17

MAGNETIC DISK DEVICE

CROSS-REFERENCE TO RELATED APPLICATIONS

This application is based upon and claims the benefit of priority from Japanese Patent Application No. 2022-150491, filed Sep. 21, 2022, the entire contents of which are incorporated herein by reference.

FIELD

Embodiments described herein relate generally to seek control of a magnetic disk device.

BACKGROUND

As customer requirements for magnetic disk devices and SDGs problems for a decarbonized society, low power consumption can be mentioned. The fastest seek, which is seek control that does not consider waiting for rotation of a disc, has a low degree of freedom in adjusting a shape of an input current (VCM current) to a VCM because it directly affects the access performance.

However, just in time (JIT) seek, which is seek control that considers waiting for rotation, can utilize the rotation waiting time as a seek time, and the VCM current shape can be adjusted according to the purpose and has a high degree of freedom.

An object of the present invention is to provide a magnetic disk device that reduces power consumption.

BRIEF DESCRIPTION OF THE DRAWINGS

FIG. 1 is a configuration diagram illustrating functions of a magnetic disk device according to an embodiment.

FIG. 3 illustrates a waveform of a VCM current and a definition of each interval in the magnetic disk device according to the embodiment.

FIG. 8 is a second block diagram of the servo control unit according to the second embodiment.

FIG. 9 is a configuration diagram illustrating functions of a seek control unit according to a third embodiment.

FIG. 10 is a block diagram of a servo control unit according to a third embodiment.

FIG. 11 is a second block diagram of the servo control unit according to the third embodiment.

FIG. 12 is a configuration diagram illustrating functions of a seek control unit according to a fourth embodiment.

FIG. 13 is a block diagram of a servo control unit according to a fourth embodiment.

FIG. 14 is a configuration diagram illustrating functions of a seek control unit according to a fifth embodiment.

FIG. 15 is a block diagram of a servo control unit according to the fifth embodiment.

FIG. 16 is a diagram illustrating a first example of a VCM current waveform generated by a seek control unit according to the embodiment.

FIG. 17 is a diagram illustrating a second example of the VCM current waveform generated by the seek control unit according to the embodiment.

DETAILED DESCRIPTION

Hereinafter, embodiments of the present invention will be described with reference to the drawings.

In general, according to one embodiment, a magnetic disk device comprises a head and a command processing unit and a seek control unit and a voice coil motor (VCM), a seek control unit and a fastest seek control unit and a JIT seek control unit.

The JIT seek control unit, which uses second time series data of a current indication value of a VCM that sets a slope having an absolute value smaller than an absolute value of a slope of the first time series data in at least one of the monotonically decreasing interval of the acceleration interval and the monotonically decreasing interval of the deceleration interval of the head or an operation acceleration of the head.

EMBODIMENT

FIG. 1 is a configuration diagram of a magnetic disk device according to an embodiment.

Figure 2:
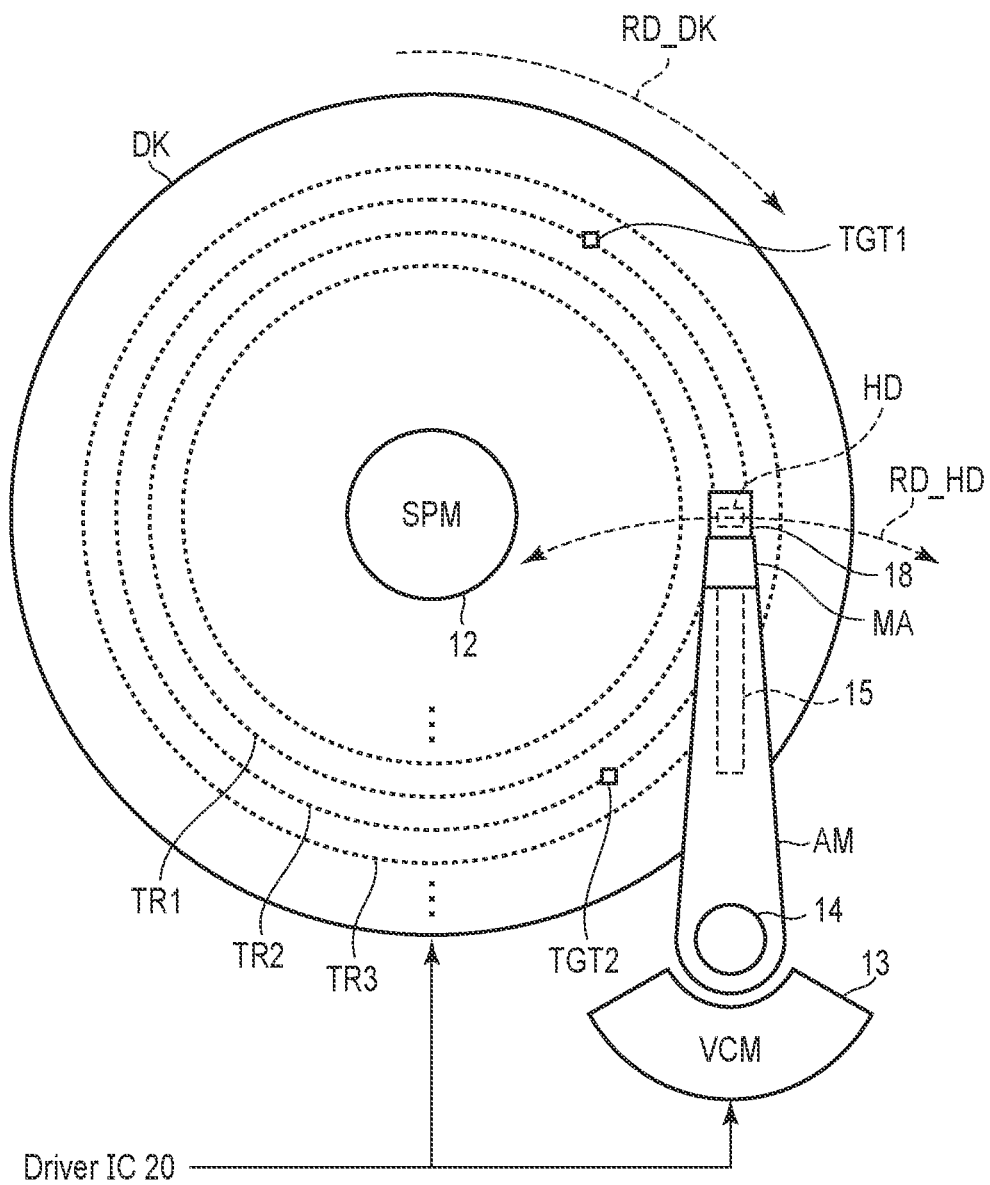
FIG. 2 is an image diagram illustrating an HDA of the magnetic disk device according to the embodiment.

An HDA 10 indicates a head disk assembly in which a magnetic disk DK supported by a spindle 12, a voice coil motor (VCM) type VCM 13, an arm AM attached to a bearing 14, and the like are stored in a housing HS. A read head RH and a writing head WH that read and write data of a magnetic disk DK are attached to a slider 18 at a distal end of the arm AM. A set of the read head RH and the writing head WH is referred to as a head HD. A position of the head HD is controlled by moving the arm AM in a circumferential direction around the bearing 14 by a VCM type actuator (the VCM 13). A suspension 15, which is depicted in FIG. 2, is attached to the arm AM, and an actuator MA or the like that can be driven independently of the VCM 13 is attached to the suspension 15.

The driver IC 20 controls each function of the HDA 10 according to control from an MPU 50, an HDC 60, or the like.

An SPM control unit 201 controls the rotation of the spindle SPM 12 of the HDA 10.

A VCM control unit 202 controls a current (or voltage) supplied to the VCM 13 of the HDA 10 and controls an operation of the VCM 13.

An MA control unit 203 controls a microactuator MA by controlling a current (or voltage) supplied to the microactuator MA.

A head amplifier IC 30 is, for example, a preamplifier, and includes a read signal detection unit 301 that amplifies a read signal read from the disk DK and outputs the read signal to a read/write (R/W) channel 40, and a write current output unit 302 that outputs a write current for writing write data output from the R/W channel 40 to the disk DK to the head HD.

The R/W channel 40 receives read data read from the disk DK from the head amplifier IC 30, transfers the read data to a host system 2, processes the write data transferred from the host system 2, and outputs the processed write data to the head amplifier IC 30.

The MPU 50 is a micro processing unit (MPU), and is a computer having an arithmetic function, a memory, and the like. The MPU 50 outputs a control signal or the like to the driver IC 20 based on a signal from the HDC 60 or the like. The MPU 50 outputs to the driver IC 20 a control signal related to seek control, tracking control, and the like for moving a position of the head HD to a predetermined position (for example, a target track) of the disk DK.

The HDC 60 is a hard disk controller, and controls each unit such as the head HD and the arm AM based on a command received from the host system 2. The HDC 60 may be configured by hardware such as an integrated circuit (IC) circuit, a program such as firmware and software, or the like, or may be configured by a combination of hardware and software.

A command processing unit 61 receives a command for acquiring data of the disk DK or writing data of the disk DK from the host system 2 or the like, and executes various processing based on the received command. For example, a track (sometimes referred to as a target track) or a sector (sometimes referred to as a target data sector) of the disk DK in which the data to be read/written exists is designated in the command. When the command processing unit 61 outputs information such as the target track and the target data sector to a servo control unit 64 by executing a command, a seek control unit 62 executes seek control to move the head HD to a position of the target track and the target data sector, and a tracking control unit 63 executes tracking control to track the head HD to the position of the target data sector. The seek control and the tracking control are general techniques, and the detailed description thereof will be omitted.

A command queue control unit 611 has a function of storing a received command in a buffer memory 80 or the like and generating a command queue and a function of selecting and executing a command of the command queue.

For example, a reordering control unit 612 determines the processing order of the command in the command queue. For example, the command queue control unit 611 executes the command according to the command processing order determined by the reordering control unit 612.

The seek control unit 62 executes seek control to move the head HD to the target track of the disk DK based on command information such as the target track transmitted from the command queue control unit 611 that executes the command. For example, the seek control unit 62 determines the trajectory of the head HD to the target track based on the current position of the head HD transmitted from the R/W channel, and outputs the VCM current value as a current indication value to the VCM 13 based on the trajectory of the head HD. The VCM 13 moves the position of the head HD by transmitting power to the head HD based on the received current indication value. The seek control unit 62 according to the present embodiment includes a fastest seek control unit 621 and a JIT seek control unit 622.

The fastest seek control is seek control focusing on moving the head HD to the target track as fast as possible. For example, a feasible seek in which the time from the start of the seek to when the head HD reaches the target track that can be read/written to the data sector (on-track) is the shortest may be set as the fastest seek control. In the fastest seek control, a control method is usually changed depending on a seek distance, but in the present embodiment, it is assumed that a control method for a medium or long distance is used.

The JIT seek control is seek control of moving the head HD to the target track in consideration of a rotation wait time (rotation waiting time) when causing the head HD to wait for rotation of the disk DK before causing the head HD to start processing of the target data sector.

The fastest seek control unit 621 controls an input current to the VCM 13 and the like in order to move the head HD by the fastest seek control. The fastest seek control unit 621 moves the head HD at high speed by, for example, applying the maximum current that can be input to the VCM 13 from the current position of the head HD to the position of the next target data sector.

Furthermore, time series data (referred to as head operation acceleration data) of the operation acceleration of the head HD in which the head HD can move at the fastest may be stored in a nonvolatile memory 90 or the like in advance based on a relationship between a movement distance of the head HD at the time of seek control and a movement time required for the movement, and the fastest seek control unit 621 may execute seek control with reference to the time series data. For example, when receiving the command, the fastest seek control unit 621 may determine the operation acceleration from the current position of the head HD to the position of the next target data sector with reference to the head operation acceleration data, determine a current indication value to the VCM 13 based on the determined operation acceleration, and execute the fastest seek control of the head HD by inputting the current indication value to the VCM 13.

Furthermore, the head operation acceleration data may be formulated in advance, for example, a program of the formula may be stored in firmware (FW), a parameter may be stored in the nonvolatile memory 90, and the fastest seek control unit 621 may calculate the operation acceleration of the head HD from the parameter acquired from the nonvolatile memory 90 using the formula in the FW when receiving the command. In a case where a plurality of formulas are included in the FW, the formulas used for the parameters may be switched.

The JIT seek control unit 622 controls an input current to the VCM 13 and the like in order to move the head HD by the JIT seek control. In a case where the head HD waits for the rotation of the disk DK before starting the processing of the target data sector, the JIT seek control unit 622 performs seek control using the waiting time for the rotation (simply referred to as a rotation waiting time).

For example, when the command information is received, the seek control unit 62 may estimate the time until when the head HD is moved to the target track in the fastest seek, and determine whether waiting for rotation of the disk DK occurs after the head HD reaches the target track. The seek control unit 62 may start the JIT seek control unit 622 and make a determination to execute the JIT seek control in a case where rotation waiting occurs or in a case where the rotation waiting time is a value larger than a certain threshold value.

Also in the JIT seek control, similarly to the case of the fastest seek control, the head operation acceleration data may be created based on a relationship between the movement distance at the time of seek control of the head HD and the movement time available for the movement, and may be stored in advance in the nonvolatile memory 90 or the like. For example, the JIT seek control unit 622 determines a head operation acceleration from the current position of the head HD to the next target track with reference to the head operation acceleration data, determines a current indication value to the VCM 13 based on the determined operation acceleration, and inputs the current indication value to the VCM 13. For example, the time available for the seek control of the head HD in the case of the JIT seek control may be determined such that the time until when the head HD starts the processing of the target data sector after arriving at the target track becomes 0 or smaller than a certain threshold.

Furthermore, the head motion acceleration data may be formulated in advance, for example, a program of the formula may be stored in the FW, a parameter may be stored in the nonvolatile memory 90, and the JIT seek control unit 622 may calculate the motion acceleration of the head HD from the parameter acquired from the nonvolatile memory 90 using the formula in the FW when receiving the command. In a case where a plurality of formulas are included in the FW, the formulas used for the parameters may be switched.

Although the example using the head operation acceleration data has been described above, time series data (VCM current indication value data) of the VCM current indication value in which the VCM current indication value is associated with the head operation acceleration may be stored in advance in the nonvolatile memory 90 or the like by using a relationship between the operation acceleration of the head HD and the input current (referred to as a VCM current indication value) to the VCM 13. For example, the fastest seek control unit 621 and the JIT seek control unit 622 perform the JIT seek control of the head HD by referring to the VCM current indication value data and inputting the VCM current indication value data to the VCM 13. The head operation acceleration data and the VCM current indication value data are collectively referred to as seek operation data.

Furthermore, the seek operation data may be formulated in advance, for example, a program of the formula may be stored in the FW, a parameter may be stored in the nonvolatile memory 90, and the fastest seek control unit 621 and the JIT seek control unit 622 may calculate the seek operation data using the formula in the FW from the parameter acquired from the nonvolatile memory 90 when receiving the command. In a case where a plurality of formulas are included in the FW, the formulas used for the parameters may be switched.

The tracking control unit 63 controls the microactuator MA to track the position of the head HD. The servo control unit 64 controls the position of the head HD by the seek control unit 62 and the tracking control unit 63. The servo control unit 64 moves the head HD to a desired position by, for example, grasping the current position of the head HD based on the servo information written in the disk DK. Since the servo control for the head HD is a general technique, detailed description thereof will be omitted.

A volatile memory 70 is a semiconductor memory in which stored data is lost when power supply is cut off, and stores data and the like necessary for processing in each unit of the magnetic disk device 1. The volatile memory 70 includes, for example, a dynamic random access memory (DRAM) or a synchronous dynamic random access memory (SDRAM). The volatile memory 70 may be a work memory used in processing of the command processing unit 61, the seek control unit 62, and the like.

The buffer memory 80 is a semiconductor memory that temporarily records data and the like. For example, the buffer memory 80 is a buffer that temporarily stores a command received by the magnetic disk device 1 from the host system 2. The buffer memory 80 is, for example, a DRAM, a static random access memory (SRAM), an SDRAM, a ferroelectric random access memory (FeRAM), or a magnetoresistive random access memory (MRAM). Note that the buffer memory 80 may be physically integrated with the volatile memory 70.

The nonvolatile memory 90 is a semiconductor memory that records stored data even when power supply is cut off. The nonvolatile memory 90 is, for example, a NOR type or NAND type flash read only memory (FROM). The nonvolatile memory 90 may store seek operation data such as a reordering table, head operation acceleration data, and VCM current indication value data. Furthermore, the seek operation data may be expressed in advance, and the parameter may be stored in the nonvolatile memory 90. By storing the parameters used for the formulas on the FW instead of the time series data, there is an effect of reducing the memory usage.

FIG. 2 is an image diagram illustrating the HDA of the magnetic disk device according to the embodiment.

The disk DK rotates in a rotation direction RD_DK around the SPM 12, and the head HD and the arm AM move in both directions of a circumference RD_HD (radial direction of the disk DK) around the bearing 14. The rotation direction RD_DK of the disk DK is one direction, and it is assumed that the disk DK rotates clockwise in the drawing. The head HD and the arm AM move in any direction on the circumference RD_HD. It is assumed that data is written for each sector allocated for each track TR (FIG. 2 illustrates only TR1, TR2, and TR3.) set in the disk DK, and the sector is also referred to as a data sector.

TGT1 and TGT2 indicate examples of target data sectors on the target track, and since the disk DK rotates in the rotation direction RD_DK, TGT1 is an example of target data approaching the head HD, and TGT2 is an example of target data that has passed through the head HD. TGT2 approaches the head HD again by the rotation of the disk DK.

For example, at the time of a data sector access request from the host system 2 to the disk DK, the seek control unit 62 may determine whether to perform the JIT seek control or the fastest seek control based on a positional relationship between the target data sector of the disk DK and the current position of the head HD. For example, in a case where the target data sector of the disk DK is TGT2, there is a time (referred to as a rotation waiting time) until the next target data sector comes just before the position of the head HD. Therefore, the seek control unit 62 may perform the JIT seek control of adjusting the seek end time within the waiting time for the rotation.

FIG. 3 illustrates a waveform of a VCM current and a definition of each interval in the magnetic disk device according to the embodiment.

A chart 6201 is an example of the characteristics of an input current to the VCM 13, and is a time series characteristic in which a horizontal axis is time and a vertical axis is the VCM current. A characteristic TC11 indicates a time series characteristic of the VCM current to the VCM 13 from the start to the end of seek control during the JIT seek control, and the REF11 and the REF12 indicate limit currents of the VCM current to be input to the VCM. A movement direction of the arm AM or the head HD by the VCM 13 (corresponding to RD_HD in FIG. 2) changes depending on whether the VCM input current is positive or negative.

Figure 4:
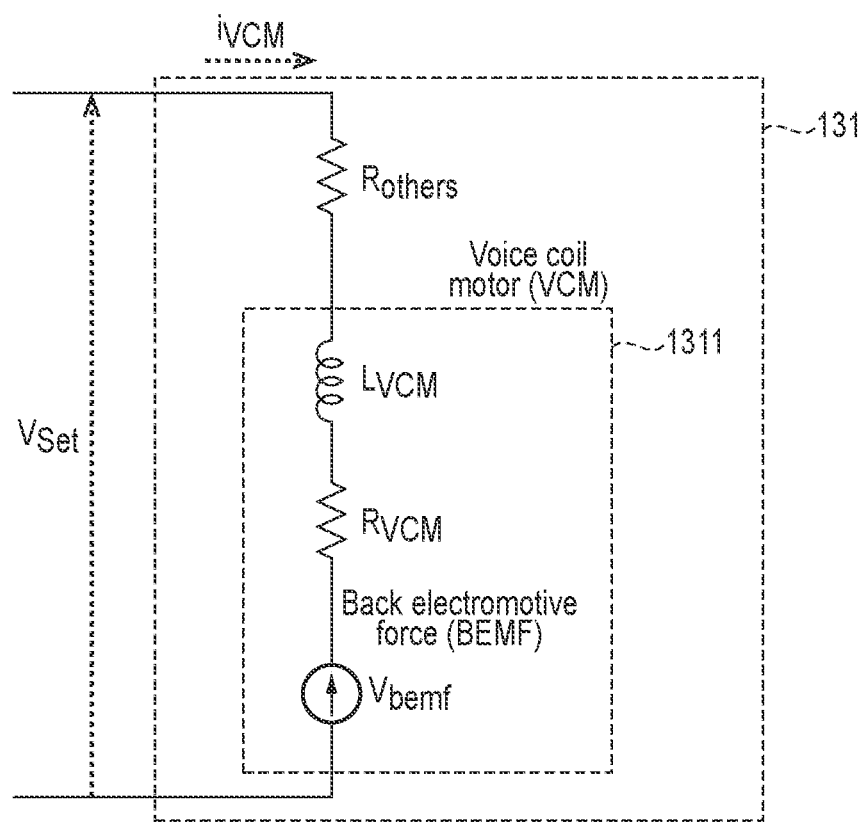
FIG. 4 illustrates an example of a circuit diagram of an electric circuit included in a VCM of the magnetic disk device according to the embodiment.

FIG. 4 illustrates an example of a circuit diagram of an electric circuit included in the VCM of the magnetic disk device according to the embodiment.

A circuit 131 is an electric circuit (equivalent circuit) viewed from a set voltage to the VCM 13, and includes an internal resistance $R_{others}$. $V_{set}$ indicates a set voltage input to the circuit 131, and $i_{VCM}$ indicates an input current to the VCM 13. A circuit 1311 indicates an electric circuit (equivalent circuit) viewed from a supply voltage to the VCM 13.

The supply voltage actually input to the VCM 13 is referred to as a VCM voltage with respect to the set voltage to the VCM 13 including the internal resistance. A supply current generated in the VCM 13 when the set voltage is applied to the VCM 13 is referred to as a VCM current (or a VCM input current). This is shown in more detail below.

In a circuit equation control interval (an AccRise interval $a_1$ and the AccFlat interval $a_2$) illustrated in FIG. 3, the VCM current $i_{VCM}$ can be expressed by a differential equation of Formula (1).

$$V_{set} = R_C i_{VCM} + L_{VCM} \frac{di_{VCM}}{dt} + V_{BEMF} \quad [0066] \tag{1}$$

$$V_{set} = R_C i_{VCM} + L_{VCM} \frac{di_{VCM}}{dt} + V_{BEMF}$$

where $R_C$ is the combined resistance ($=R_{others}+R_{VCM}$) of the circuit including the VCM, $i_{VCM}$ is the VCM current [A], $L_{VCM}$ is the VCM inductance [H], $V_{BEMF}$ is the back electromotive voltage [V], $V_{set}$ is the set voltage [V], and $V_{sup}$ is the supply voltage [V] to the VCM 13. The back electromotive voltage $V_{BEMF}$ is expressed by Formula (2). Note that the circuit equation control interval may include a DecRise interval $d_1$ and a DecFlat interval $d_2$.

$$V_{BEMF} = K_f v \tag{2}$$

Here, v is a moving speed of the head HD (moving speed of the disk DK in the radial direction), and $K_f$ is a current force constant [N/A]. Furthermore, a relationship between the VCM current $i_{VCM}$ and the head acceleration a is expressed by the following formula.

$$a = \frac{K_f}{m} i_{VCM} \quad [0069] \tag{3}$$

$$a = \frac{K_f}{m} i_{VCM}$$

where m is an equivalent head mass m [kg].

An acceleration interval ACC in FIG. 3 is a time interval in which the current is input to the VCM 13 to accelerate the head HD and increase the speed after the seek control is started. A constant velocity interval VelConst is a time interval in which the head HD performs a motion at a constant velocity or close to a constant velocity by setting the input current to the VCM 13 to 0 or a minute value. A deceleration interval DEC is a time interval in which acceleration is applied to the head HD in a direction opposite to the moving direction to decrease the speed after the constant velocity interval VelConst. In the deceleration interval DEC, a current in a direction opposite to the input current applied to the acceleration interval ACC is input to the VCM 13.

For example, in the current level adjustment in the acceleration interval ACC, the set voltage $V_{set}$ is changed within the supply voltage $V_{sup}$ in Formula (1), and the time of the constant velocity interval VelConst is adjusted, so that the seek control for a long time in consideration of the rotation waiting time can be performed with respect to the reference seek (the fastest seek may be used) such that the target data sector comes just before the position of the head HD next in time.

In the chart 6201 of FIG. 3, time t0 to t2 is a time interval in which the VCM current is generated according to Formula (1) described above, and is referred to as a circuit equation control interval. Time t2 to t3 is a time interval when the VCM set voltage is set to 0, and is referred to as a discharge control interval. Time t3 to t4 is a time interval when the VCM current≈0, and is referred to as a constant velocity control interval. Time t4 to t7 is a time interval in which the VCM setting voltage is applied in a direction opposite to the direction from time t0 to t2, and is referred to as a deceleration control interval because the moving speed of the head HD is controlled to be decelerated.

A chart 6202 illustrates time series characteristics in which a horizontal axis represents time and a vertical axis represents a differential value of the input current to the VCM. A characteristic TC12 indicates a time series characteristic of a differential value with respect to the characteristic TC11.

The horizontal axes of the chart 6201 and the chart 6202 share the same time axis, $a_1$ represents a time interval from time t0 to t1, $a_2$ represents a time interval from time t1 to t2, and $a_3$ represents a time interval from time t2 to t3, and each represents an interval in which acceleration is applied to the head HD, that is, an interval in which a current is applied to the VCM 13. v1 indicates a time interval from time t3 to t4, and indicates an interval in which no acceleration is applied to the head HD or a minute acceleration is applied, that is, an interval in which no current is applied to the VCM 13 or a minute current is applied. $d_1$ represents a time interval from time t4 to t5, $d_2$ represents a time interval from time t5 to t6, and $d_3$ represents a time interval from time t6 to t7, and each represents an interval in which acceleration is applied to the head HD in a direction opposite to $a_1$, $a_2$, and $a_3$, that is, an interval in which a current is applied to the VCM 13.

A chart 6203 illustrates an absolute value of the characteristic of the chart 6201, and a chart 6204 illustrates an absolute value of the characteristic of the chart 6202. Furthermore, the horizontal axes of the chart 6203 and the chart 6204 share the same time, and the time of the horizontal axes of the chart 6201 and the chart 6202 is the same, and the times t0 to t7 indicate the same time.

As indicated by the characteristic TC11 of the chart 6201, the input current (VCM current) to the VCM 13 has an acceleration interval (interval ACC) in which the head HD is accelerated by applying a large current with a certain polarity, a constant-speed interval (interval VelConst) of the head HD by applying a constant current near 0 to the VCM current or not applying a current, and a deceleration interval (interval DEC) in which the head HD is decelerated by applying a current with a polarity opposite to the interval ACC in order to stop the head HD at the target radial position (target track).

Among them, the acceleration interval ACC has an AccRise interval (time interval $a_1$) in which the VCM current rises, an AccFlat interval (time interval $a_2$) in which a high VCM current level continuous with the AccRise interval is maintained, and an AccFall interval (time interval $a_3$) in which the VCM current continuous with the AccFlat interval falls near zero, and the deceleration interval has a DecRise interval (time interval $d_1$) in which the VCM current rises in a reverse polarity to acceleration, a DecFlat interval (time interval $d_2$) in which a VCM current level high in a reverse polarity to acceleration continuous with the DecRise interval is maintained, and a DecFall interval (time interval $d_3$) in which the VCM current continuous with the DecFlat interval falls near zero.

The AccFlat interval $a_2$ is also defined as follows. That is, the AccFlat interval $a_2$ is a time interval having a start point (corresponding to time t1 of the characteristic TC21) at which the absolute value of the VCM current is maximized during the interval ACC, and a time (corresponding to time t2 of the characteristic TC11) at which the absolute value of the first-order derivative of the VCM current is maximized in a time after the start point t1 and before a time (corresponding to time t4 of the characteristic TC22) at which the polarity of the VCM current is inverted, as an end point.

The DecFlat interval is also defined as follows. That is, the time interval is a time interval starting from a time (corresponding to time t5 of the characteristic TC21) at which the absolute value of the VCM current in the deceleration interval DEC becomes maximum during the interval DCC, and ending at a time (corresponding to time t6 of the characteristic TC11) at which the absolute value of the first-order derivative of the VCM current becomes maximum in a time after the start point t5 and before a seek end time (corresponding to time t7 of the characteristic TC22) at which the VCM current becomes close to 0. Note that since the VCM current and the head acceleration can be converted by the formula shown later, the VCM current can be replaced by the head acceleration. The waveform of the VCM current in FIG. 3 is also an example of the VCM current indication value data, and may be stored in the nonvolatile memory 90 or the like as seek operation data.

Hereinafter, an embodiment according to the above configuration will be described.

First Embodiment

The magnetic disk device according to the present embodiment includes a servo control unit that changes waveform shapes of the VCM current and the operation acceleration of the head for executing seek control according to a rotation waiting time. More specifically, in at least one of the acceleration interval ACC and the deceleration interval DEC, the servo control unit according to the present embodiment has a monotonically decreasing interval of the absolute value of the "VCM current and head acceleration" in consideration of a back electromotive voltage in a case where there is no rotation waiting time, and performs control so that an interval average value of the first-order differential values of the absolute value of the "VCM current and head acceleration" is larger than that in a case where there is no rotation waiting time in the monotonically decreasing interval of the absolute value of the "VCM current and head acceleration" in consideration of the back electromotive voltage in a case where there is a rotation waiting time.

Figure 5:
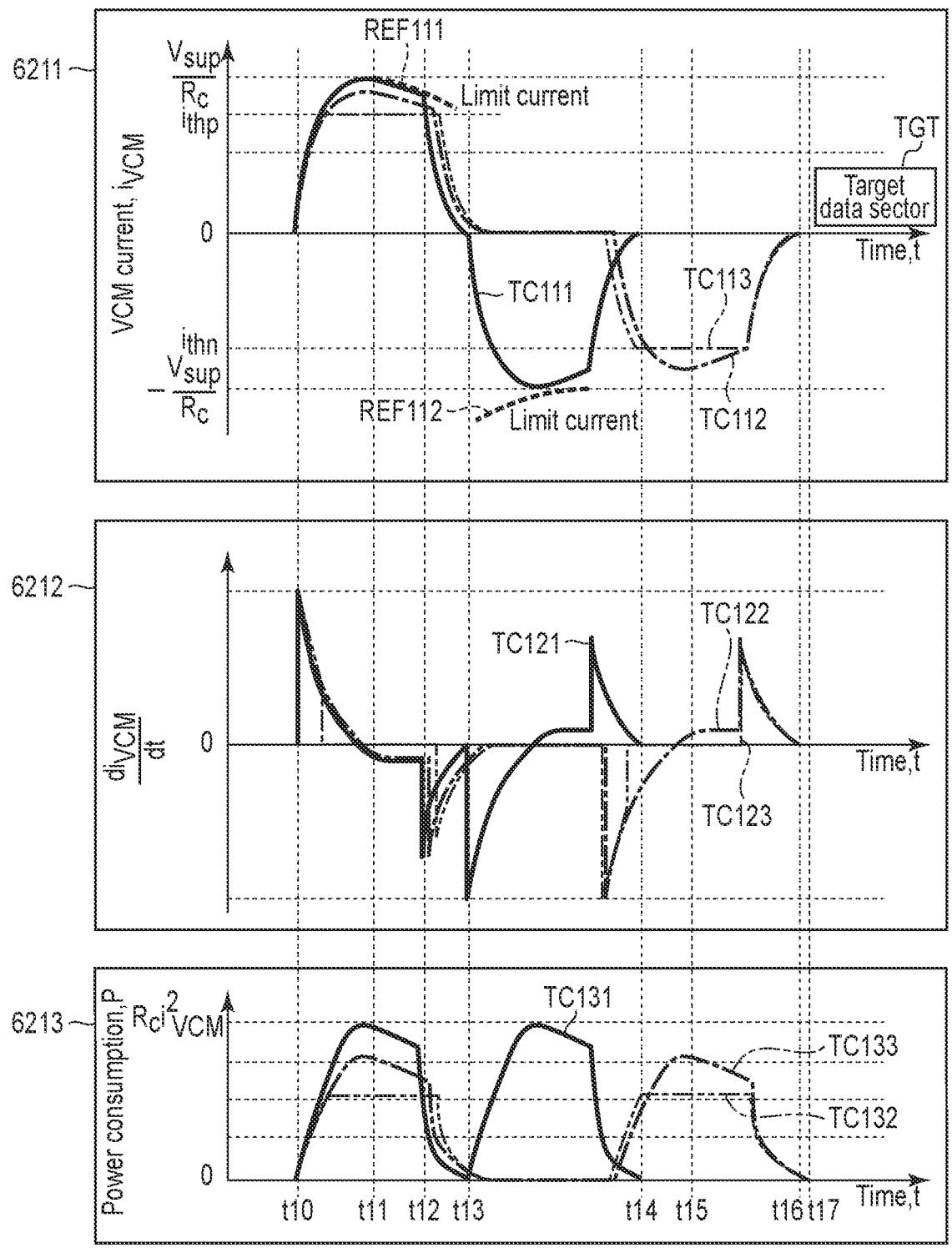
FIG. 5 is a diagram illustrating an example of a VCM current waveform and the like generated by a seek control unit according to a first embodiment.

FIG. 5 is a diagram illustrating an example of a VCM current waveform and the like generated by a servo controller according to the first embodiment.

A chart 6211 shows time series characteristics with a horizontal axis representing time and a vertical axis representing the input current to the VCM (VCM current). The characteristics TC111, TC112, and TC113 indicate time series characteristics of the VCM current, and REF 111 and REF 112 indicate limit currents of the input current to the VCM. The chart 6211 may be stored in the nonvolatile memory 90 as VCM current indication value data and used by the seek control unit 62.

A chart 6212 illustrates time series characteristics in which a horizontal axis represents time and a vertical axis represents a differential value of the input current to the VCM. The characteristics TC121, TC122, and TC123 indicate time series characteristics of differential values of the VCM current with respect to the characteristics TC111, TC112, and TC113, respectively.

A chart 6213 illustrates time series characteristics in which a horizontal axis represents time and a vertical axis represents input power to the VCM. The characteristics TC131, TC132, and TC133 indicate time series characteristics of power calculated from the VCM current with respect to the characteristics TC111, TC112, and TC113, respectively.

It is assumed that the horizontal axes of the chart 6211, the chart 6212, and the chart 6213 share the same time axis, and the times of t10 to t17 on the horizontal axis of the chart 6213 coincide with each other in all the charts.

The characteristic TC111 indicates a typical example of the VCM current in the case of the fastest seek control. In the fastest seek control, since the rotation waiting time is not considered, the seek operation ends at time t14 earlier than the time at which the processing for the target data sector is started.

When the same fastest seek control method is used, the shape of the VCM current for the same seek distance and the same seek time is the same. For example, the waveform of the characteristic TC111 from time t10 to the vicinity of time t12 (corresponding to a circuit equation control interval from AccRise to AccFlat in FIG. 3) is almost uniquely determined with respect to the same fastest seek control method, and a large current is caused to flow in an applicable range (an applied current margin is reduced). For example, when the same fastest seek control method is used, it is uniquely determined such that the end of the AccFlat interval is advanced when a seek distance is short, and the end of the AccFlat interval is delayed when the seek distance is long. When the same fastest seek control method is used, a monotonically decreasing interval of the VCM current shown from time t11 to t12 (corresponding to AccFlat in FIG. 3) of the characteristic TC111 always occurs.

Thereafter, in the waveform around time t12 to t13 (AccFall interval in FIG. 3), a small current flows with respect to the current that can be applied in order to perform the discharge control (the margin of the applied current is increased). Similarly, a monotonically increasing interval of the VCM current always occurs near time t13 after the characteristic TC111 that is the deceleration interval (corresponding to DecFall in FIG. 3). That is, in the AccFlat interval and the DecFlat interval, a monotonically decreasing interval of the absolute value of the VCM current always occurs. Note that, in the case of the fastest seek control, since the AccRise interval is the fastest seek of the saturation acceleration, the VCM current in the AccRise interval of the characteristic TC111 overlaps with the limit current.

The characteristic TC112 is an example of the VCM current in the case of the JIT seek control, and is an example in which an absolute value of the VCM current is reduced with respect to the TC111. The characteristic TC112 includes a time interval in which the VCM current value is 0 or a value close to 0 during the time t13 to t14 as compared with the characteristic TC111 by the fastest seek control, so that the input power from the time t10 to t17 can be reduced. The input power of each characteristic corresponds to an area surrounded by each characteristic and the x axis in the chart 6213.

The characteristic TC113 is an example of the VCM current in the case of the JIT seek control, and is an example of the VCM current in a case where an upper limit value is set for the absolute value of the VCM current with respect to the characteristic TC112. In the seek control using the characteristic TC113, the input power can be further reduced as compared with the case of using the characteristic TC112.

As indicated by the characteristic TC111, in the case of the fastest seek control, in the acceleration interval of the head HD from the start of the seek control, the maximum VCM current that can be input is input to the VCM in order to perform the saturation acceleration control, but the VCM current falls within the limit current. On the other hand, in the deceleration interval, in order to suppress settling of the head HD, the VCM current is not the maximum current that can be input, and a current suppressed to some extent is input. Furthermore, in the characteristic TC111, there is an interval in which a temporal decrease due to saturation acceleration control, back electromotive force, or the like occurs with respect to the absolute value of the VCM current in the acceleration interval (corresponding to an interval of $i_{VCM}>0$) and the deceleration interval (corresponding to an interval of $i_{VCM}<0$). Note that the relationship between the acceleration interval or the deceleration interval and the $i_{VCM}$ is relative. For example, in a case where the acceleration interval ($i_{VCM}>0$) and the deceleration interval ($i_{VCM}<0$) in FIG. 5 are set in a seek (forward seek) from the outer periphery to the inner periphery of the disk, a current shape in which the polarity of the absolute value of the VCM current is reversed from that in the acceleration interval ($i_{VCM}<0$), deceleration interval ($i_{VCM}>0$) is obtained in a seek (reverse seek) from the inner periphery to the outer periphery of the disk.

In the characteristics TC112 and TC113 according to the low power consumption JIT seek control of the present embodiment, in the circuit equation control interval of the acceleration and deceleration interval, control is performed such that the degree of level decrease caused by the back electromotive force of the absolute value of the VCM current is smaller than that in the TC112 or the level does not decrease, that is, the inclination of the VCM current time series in the AccFlat interval is reduced or the VCM current time series has no inclination. Alternatively, the VCM currents of the characteristics TC111 and TC113 is generated or controlled such that the slope of the characteristic is smaller than the slope of the monotonically decreasing interval of the absolute value of the VCM current of the characteristic TC111, particularly from time t11 to t12. As illustrated in the chart 6212, this may be controlled such that the interval average value of the first-order differential values of the absolute value of the VCM current is larger than that in the normal seek in the monotonically decreasing interval of the absolute value of the VCM current in consideration of the back electromotive voltage. More specifically, it will be described below.

In the characteristic TC112 of the JIT seek, for example, from around time t11 to around time t12 of the acceleration interval (corresponding to the interval of $i_{VCM}>0$), for example, the term $V_{BEMF}$ of the circuit equation (1) is operated to control the degree of temporal level decrease caused by the back electromotive force of the absolute value of the VCM current to be small. In the characteristic TC113 according to the present embodiment, the temporal level decrease caused by the back electromotive force of the absolute value of the VCM current is controlled to be 0 or very small at the same time.

Similarly, in the characteristic TC112 of the JIT seek, in the deceleration interval (corresponding to the interval in which $i_{VCM}<0$), for example, the term $V_{BEMF}$ of the circuit equation (1) is operated so as to reduce the degree of decrease in the level over time caused by the back electromotive force of the absolute value of the VCM current, that is, the time series characteristic of the absolute value of the VCM current is controlled so as to have a shape in which the decrease over time caused by the back electromotive force is small or not reduced. Similarly, in the characteristic TC113, in the deceleration interval (corresponding to the interval of $i_{VCM}<0$), control is performed such that the temporal level decrease due to the back electromotive force to the VCM current becomes 0 or a very minute shape, that is, the temporal series characteristic of the absolute value of the VCM current becomes a shape in which the temporal decrease due to the back electromotive force is small or does not decrease.

When the time series characteristic 6212 of the first-order differential value of the VCM current is considered together, in the characteristics TC122 and TC123, in the monotonically decreasing interval of the absolute value of the VCM current in consideration of the back electromotive voltage (corresponding to time t11 to t12 or time t15 to t16), the interval average value of the first-order differential value of the absolute value of the VCM current is controlled to be larger than that in the normal seek. Therefore, when the VCM current waveform TC111 of the fastest seek in a case where there is no rotation waiting time is compared with the VCM current waveform TC113 by the low power consumption JIT seek control of the present embodiment in a case where there is a rotation waiting time, a conditional formula of Formula (5) is established.

$$ave\left(\frac{d|i_{VCM\_NoRotWait}|}{dt}\right) < ave\left(\frac{d|i_{VCM\_RotWait}|}{dt}\right) \quad (5)$$

$$ave\left(\frac{d|i_{VCM\_NoRotWait}|}{dt}\right) < ave\left(\frac{d|i_{VCM\_RotWait}|}{dt}\right)$$

Furthermore, the following formula can also be written using the head acceleration a from Formula (3).

$$ave\left(\frac{d|a_{VCM\_NoRotWait}|}{dt}\right) < ave\left(\frac{d|a_{VCM\_RotWait}|}{dt}\right) \quad (6)$$

$$ave\left(\frac{d|a_{VCM\_NoRotWait}|}{dt}\right) < ave\left(\frac{d|a_{VCM\_RotWait}|}{dt}\right)$$

Here, ave ( ) represents an interval average value, and the left side and the right side of Formula (5) each represent an interval average value of the "absolute value of the VCM current" in the monotonically decreasing interval affected by the back electromotive voltage. Furthermore, the left side and the right side of Formula (6) indicate interval average values of the "absolute value of the head acceleration" in the monotonically decreasing interval. Furthermore, the monotonically decreasing interval is an AccFlat interval (an interval from around time t11 to around t12) or a DECFlat interval (an interval from around time t14 to around t15) which is an interval affected by the back electromotive force caused by the input current.

$$\frac{d|i_{VCM\_NoRotWait}|}{dt} \text{ and } \frac{d|a_{VCM\_NoRotWait}|}{dt}$$

Here,
are negative values or 0.

$$\frac{d|i_{VCM\_NoRotWait}|}{dt} \text{ and } \frac{d|a_{VCM\_NoRotWait}|}{dt}$$

are negative values or 0.

For example, since in the monotonically decreasing interval of the characteristic TC111, the absolute value of the TC111 is also a decreasing function, the following formula is established.

$$\frac{d|i_{VCM\_NoRotWait}|}{dt}$$

is a negative value.

However, since the characteristic TC113 according to the present embodiment has a constant value in the monotonically decreasing interval, the following formula is established.

$$\frac{d|a_{VCM\_NoRotWait}|}{dt}$$

is 0.

Furthermore, the power consumption P of the electric circuit including the VCM in FIG. 4 is expressed by the following formula.

$$P = R_C i_{VCM}^2 \quad (4)$$

Here, $R_C$ is a combined resistance of a circuit including the VCM.

Since the VCM current $i_{VCM}$ affects the power consumption P to the second power, when the VCM current is made constant in the AccFlat interval as in the characteristic TC113, the peak of the VCM current $i_{VCM}$ is lowered, and the effect of lowering the power consumption is large. According to the present embodiment, for example, a power consumption reduction of 2.5% is expected in a 15% distance seek of a data area width on the magnetic disk.

The JIT seek control unit 622 performs the JIT seek control based on the characteristics TC112 and TC113. For example, current indication value data based on the characteristics TC112 and TC113 or a parameter for the formulated current indication value data may be stored in a database in the nonvolatile memory 90 or the like as seek operation data, and the seek operation data may be downloaded from the nonvolatile memory 90 to the buffer memory 80 or the like and referred to by the JIT seek control unit 622 when the power supply of the magnetic disk device 1 is added.

In the following embodiments, a method of changing the waveform shapes of the VCM current and the head acceleration, that is, a method of generating current indication value data and head operation acceleration data will be described.

Second Embodiment

In the present embodiment, a JIT seek control method using a target acceleration limiting method will be described.

Figure 6:
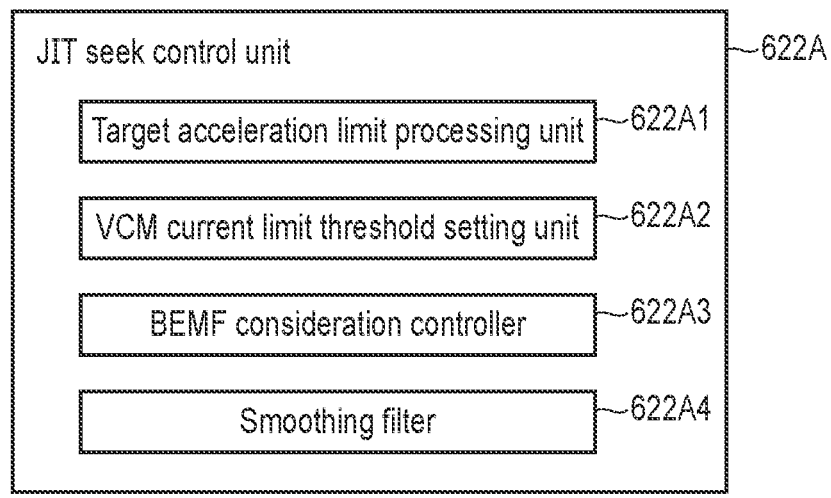
FIG. 6 is a configuration diagram illustrating functions of a seek control unit according to a second embodiment.

FIG. 6 is a configuration diagram illustrating functions of a JIT seek control unit according to a second embodiment.

A JIT seek control unit 622A includes a VCM current limit threshold setting unit 622A2, a target acceleration limit processing unit 622A1, and a BEMF consideration controller 622A3 which is a servo controller.

The VCM current limit threshold setting unit 622A2 sets a threshold (referred to as a VCM current limit threshold) for setting an upper limit value to the absolute value of the VCM current. More specifically, the VCM current limit threshold setting unit 622A2 sets a threshold for limiting the VCM current in at least one of the acceleration interval ACC and the deceleration interval DEC.

The target acceleration limit processing unit 622A1 limits the input target acceleration $a_{tgt}$ with a threshold (referred to as a head acceleration threshold) obtained by converting the VCM current limit threshold into the acceleration of the head HD by Formula (3).

The BEMF consideration controller 622A3 outputs the VCM current indication value based on a target acceleration $a_{tgt}$, a target speed $V_{tgt}$, a target position $P_{tgt}$, and the like of the head HD output by the target acceleration limiting processing unit 622A1. Note that the target acceleration of the head HD output to the BEMF consideration controller 622A3 may be generated in advance as head operation acceleration data by the target acceleration limit processing unit 622A1 using the head acceleration threshold and stored in the nonvolatile memory 90. For example, the target acceleration limit processor 622A1 downloads the head operation acceleration data from the nonvolatile memory 90 to the buffer memory 80 or the like and refers to the head operation acceleration data when performing the JIT seek control.

A smoothing filter 622A4 is a digital filter for smoothing, and smooths the input target acceleration over time, for example. The smoothing filter 622A4 may or may not be used as an option.

Figure 7:
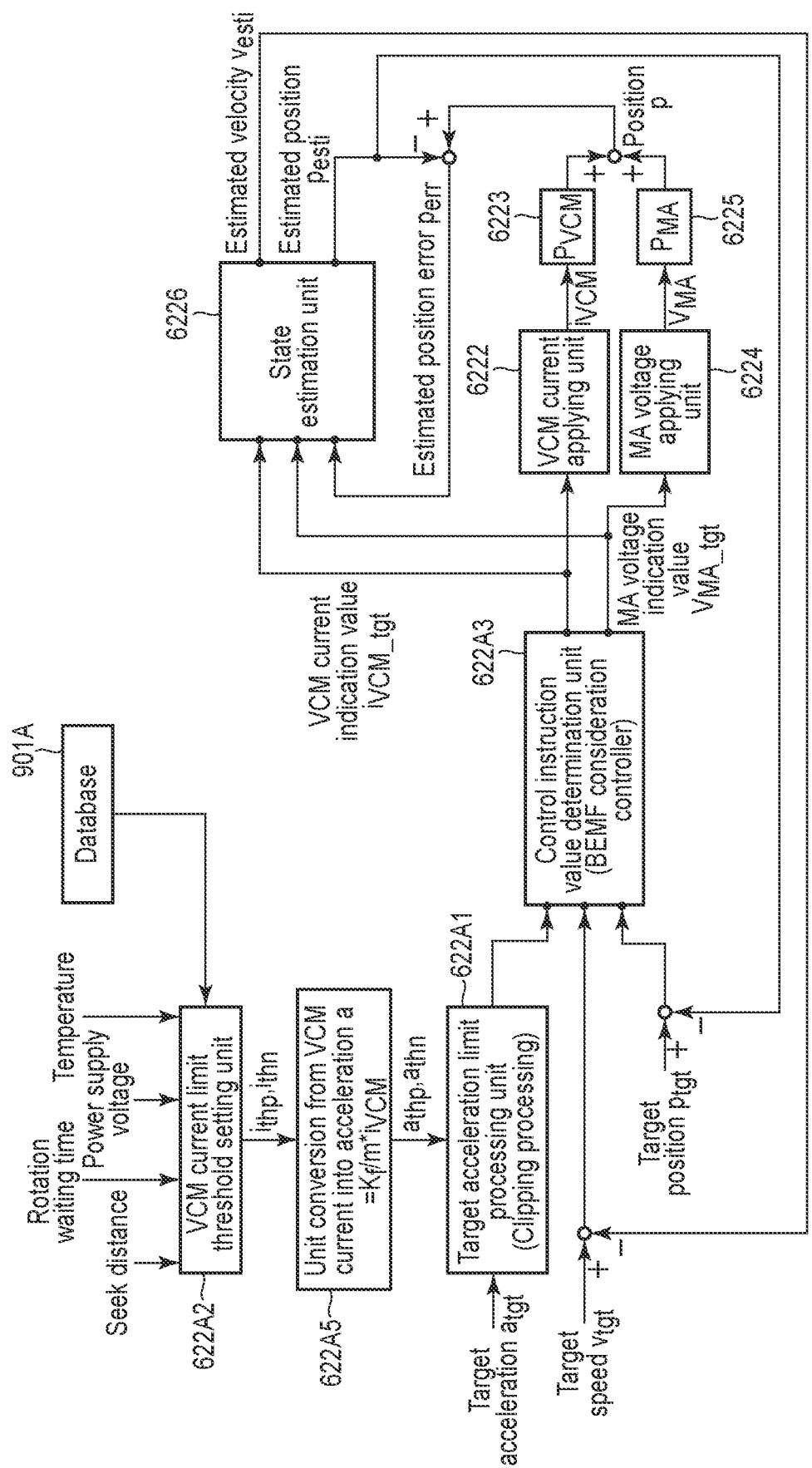
FIG. 7 is a block diagram of a servo control unit according to the second embodiment.

FIG. 7 is a block diagram of a servo control unit according to the second embodiment, and is a block diagram including functions of the JIT seek control unit 622A, the driver IC 20, and the like.

In the JIT seek control unit 622A, the control instruction value determination unit (BEMF consideration controller) 622A3 determines and outputs the indication values of the current and the voltage input to the VCM 13 and the microactuator MA based on the target acceleration $a_{tgt}$, the target speed $V_{tgt}$, the target position $P_{tgt}$, and the like. Specifically, the control instruction value determination unit 622A3 calculates the VCM current indication value from Formula (3) with respect to the input target acceleration $a_{tgt}$, and outputs the VCM current indication value. A VCM current applying unit 6222 inputs a current to a $P_{VCM}$ 6223 (corresponding to a transfer function of the VCM 13) based on the input VCM current indication value.

Furthermore, an MA voltage applying unit 6224 applies a voltage to a $P_{MA}$ 6225 (corresponding to the transfer function of the microactuator MA) based on the input MA voltage indication value.

A state estimation unit 6226 outputs the estimated position $P_{esti}$ and the estimated velocity $V_{esti}$ of the head based on the error $P_{err}$ between the position P of the head HD acquired by the read header RH from the servo signal of the disk DK or the like and the estimated position $P_{esti}$ of the head and information such as the VCM current indication value and the MA voltage indication value output from the control instruction value determination unit 622A3. The estimated position $P_{esti}$ and the estimated speed $V_{esti}$ of the head are fed back to the next target speed $V_{tgt}$, the target position $P_{tgt}$, and the like, and become inputs to the next control instruction value determination unit 622A3. Since the principle of the servo control in the JIT seek control unit 622A is similar to the conventional servo control, the detailed description thereof will be omitted.

The target acceleration limit processing unit 622A1 performs clipping processing (saturation processing) of the target acceleration $a_{tgt}$. The acceleration interval head acceleration threshold value $a_{thp}$ and the deceleration interval head acceleration threshold value $a_{thn}$ are used as thresholds for the clipping processing. The threshold for the clipping processing is set by the VCM current limit threshold setting unit 622A2.

The VCM current limit threshold setting unit 622A2 uses at least one piece of information of the seek distance, the rotation waiting time, the power supply voltage $V_{sup}$, the environmental temperature, or the VCM temperature when the seek control unit 62 starts seek control to generate the VCM current threshold value $i_{thp}$ for the acceleration interval and the VCM current threshold value $i_{thn}$ for the deceleration interval with reference to the FW (firmware) or a table data 901A on the nonvolatile memory 90.

The table data 901A is, for example, data in which the seek distance, the rotation waiting time, the power supply voltage $V_{sup}$, the environmental temperature, or the VCM temperature and the like, is associated with the threshold value for the VCM current. A unit conversion unit 622A5 converts the VCM current threshold into the acceleration threshold according to Formula (3).

The target acceleration $a_{tgt}$ clipped by the above method does not become smooth in the acceleration dimension and becomes discontinuous in the dimension of the first-order derivative of the acceleration, for example. The discontinuity occurring in the time series data of the target acceleration $a_{tgt}$ may cause mechanical vibration.

FIG. 8 is a second block diagram of the servo control unit according to the second embodiment, and a difference from FIG. 7 is the smoothing filter 622A4.

In a case where the mechanical vibration is caused by the seek operation data of the discontinuous target acceleration $a_{tgt}$, the target acceleration $a_{tgt}$ smoothed using the smoothing filter 622A4 is used as an input to the BEMF consideration controller 622A3, so that the mechanical vibration can be made smooth in the acceleration dimension, for example, continuous in the dimension of the first-order derivative of the acceleration, and the mechanical vibration can be suppressed.

Third Embodiment

In the present embodiment, a low power consumption JIT seek control method using the VCM current indication value limiting method will be described.

FIG. 9 is a configuration diagram illustrating functions of a seek controller according to a third embodiment.

A difference from the JIT seek control unit 622A in FIG. 6 is that a VCM current indication value limit processing unit 622B1 is provided instead of the target acceleration limit processing unit 622A1. Since a VCM current limit threshold setting unit 622B2, a BEMF consideration controller 622A3, and a smoothing filter 622B4 have the same functions as those of the configuration having the same name included in FIG. 6, detailed description thereof will be omitted. The VCM current indication value limit processing unit 622B1 will be described later.

FIG. 10 is a block diagram of a servo controller according to the third embodiment.

A difference from FIG. 7 is that a VCM current indication value limit processing unit 622B1 is provided instead of the target acceleration limitation processing unit 622A1. Since the other configurations have the same functions as those of the configurations having the same names included in FIG. 7, the detailed description thereof will be omitted.

The VCM current indication value limit processing unit 622B1 performs clipping processing (saturation processing) of the VCM current indication value $i_{VCM\_tgt}$. The VCM current threshold $i_{thp}$ for the acceleration interval and the VCM current threshold $i_{thn}$ for the deceleration interval are used as thresholds for the clipping processing. The threshold for the clipping processing is set by the VCM current limit threshold setting unit 622B2. The VCM current limit threshold setting unit 622B2 generates the VCM current threshold value $i_{thp}$ for the acceleration interval and the VCM current threshold value $i_{thn}$ for the deceleration interval by referring to a table data 901B in the FW or the nonvolatile memory 90 using at least one piece of information of the seek distance, the rotation waiting time, the power supply voltage $V_{sup}$, the environmental temperature, or the VCM temperature at the start of seek control. The table data 901B is, for example, data in which the seek distance, the rotation waiting time, the power supply voltage $V_{sup}$, the environmental temperature, or the VCM temperature is associated with the threshold value for the VCM current.

For example, the characteristic TC113 in FIG. 5 is an example of the VCM current indication value data in a case where the VCM current limit threshold is $i_{thp}$ or $i_{thn}$. In an acceleration interval (from around time t11 to t13), a ceiling is generated such that the VCM current indication value follows the VCM current limit threshold $i_{thp}$, and in a deceleration interval (from around time t14 to t17), a floor is generated such that the VCM current indication value follows the VCM current limit threshold $i_{thn}$. The VCM current limit threshold may be applied to both the acceleration interval ACC and the deceleration interval DEC as in the characteristic TC113 in FIG. 5, or may be applied to either one of the acceleration interval ACC and the deceleration interval DEC.

The clipped VCM current indication value data $i_{VCM\_tgt}$ does not become smooth as illustrated in the characteristic TC113 of FIG. 5, and becomes discontinuous in the dimension of the first-order derivative of the current, for example. Discontinuity occurring in the time series data of the VCM current indication value data $i_{VCM\_tgt}$ (equivalent to the target acceleration of the head) may cause mechanical vibration.

FIG. 11 is a second block diagram of the servo controller according to the third embodiment, and a difference from FIG. 10 is the smoothing filter 622B4.

In a case where mechanical vibration is caused by seek operation data of the discontinuous VCM current indication value data $i_{VCM\_tgt}$, the target acceleration $a_{tgt}$ is smoothed by the smoothing filter, so that the target acceleration $a_{tgt}$ can be smooth in the acceleration dimension, and can be continuous in the dimension of the first-order derivative of the current, for example, and the mechanical vibration can be suppressed.

Fourth Embodiment

In the present embodiment, a JIT seek control method of performing generation processing of a VCM current indication value using a BEMF coefficient will be described.

FIG. 12 is a configuration diagram illustrating functions of a seek controller according to a fourth embodiment.

A difference from the JIT seek control unit 622A in FIG. 6 is that a BEMF coefficient acquisition unit 622C4 is provided instead of the smoothing filter 622B4. Since a VCM current limit threshold setting unit 622C2, and a BEMF consideration controller 622C3 have the same functions as those of the configuration having the same name included in FIG. 6, detailed description thereof will be omitted. The BEMF coefficient acquisition unit 622C4 will be described later.

FIG. 13 is a block diagram of a servo control unit according to the fourth embodiment.

The difference from FIG. 7 is that the target acceleration limit processing unit 622A1 is eliminated and the BEMF coefficient acquisition unit 622C4 is provided. Since the other configurations have the same functions as those of the configurations having the same names included in FIG. 7, the detailed description thereof will be omitted.

The BEMF coefficient acquisition unit 622C4 acquires a BEMF coefficient stored in the database 901C and sets the BEMF coefficient in the control instruction value determination unit 622C3. The BEMF coefficient is a coefficient that changes the degree of influence of the back electromotive force in the circuit equation control interval from around time t0 to around t2 in the chart 6201 of FIG. 3. In the present embodiment, the upper limit of the VCM current is adjusted by changing the degree of level decrease with respect to the absolute value of the VCM current caused by the back electromotive force using a BEMF coefficient (0 or more and less than 1) instead of the VCM current limit threshold value.

The control instruction value determination unit 622C3 generates a VCM current indication value for the input target acceleration $a_{tgt}$ using the BEMF coefficient input from the BEMF coefficient acquisition unit 622C4.

The slope of the time series of the VCM current indication value can be changed by changing the BEMF coefficient $k_{BEMF}$. In order to reduce the slope, the absolute value of the back electromotive voltage $V_{BEMF}$ set calculated by Formula (12) can be reduced by setting the BEMF coefficient $k_{BEMF}$ in a range of 0 to 1, and the slope of the VCM current indication value can be reduced by using the back electromotive voltage $V_{BEMF\_set}$ calculated as Formula (11) in the circuit equation.

$$V_{set} = R_C i_{VCM} + L_{VCM}\frac{di_{VCM}}{dt} + V_{BEMF\_set} \quad (11)$$

$$V_{BEMF\_set} = k_{BEMF} K_f v \quad (12)$$

As can be seen from the example of the VMC current indication value data in a case where the BEMF coefficient $k_{BEMF}$ is set illustrated in the characteristic TC52 of FIG. 16 to be described later, the absolute value of the VMC current indication value in the circuit equation control interval (from time t51 to around time t53) is suppressed to be lower than the TC51. Furthermore, there is a circuit equation control interval according to the circuit equation similarly in the deceleration interval (from time t54 to around time t57), and the absolute value of the VMC current indication value is suppressed to be lower than TC51 by setting of the BEMF coefficient $k_{BEMF}$.

Moreover, similarly to the VCM current limit threshold setting unit 622A2 in the second embodiment, the upper limit of the VCM current indication value may be set by limiting the threshold for the target acceleration $a_{tgt}$ input to the control instruction value determination unit 622C3 using the VCM current limit threshold setting unit 622C2.

The VCM current limit threshold setting unit 622C2 uses at least one piece of information of the seek distance, the rotation waiting time, the power supply voltage $V_{sup}$, the environmental temperature, or the VCM temperature at the time of starting a seek to generate the VCM current threshold value $i_{thp}$ for the acceleration interval and the VCM current threshold value $i_{thn}$ for the deceleration interval by referring to a table in the FW or the nonvolatile memory, convert the VCM current threshold value $i_{thp}$ for the acceleration interval and the VCM current threshold value $i_{thn}$ for the deceleration interval into the acceleration threshold value $a_{thp}$ for the acceleration interval and the deceleration threshold value $a_{thn}$ for the deceleration interval by Formula (3), and set the obtained acceleration threshold value $a_{thp}$ for the acceleration interval and deceleration threshold value $a_{thn}$ for the deceleration interval to the target acceleration $a_{tgt}$, thereby adjusting the acceleration and the VCM current level in the AccFlat and DecFlat intervals. When the VCM current limit threshold setting unit 622C2 is used, there is no slope in the AccFlat and DecFlat intervals, and the slope has a constant value.

In the magnetic disk device of the present modification, it is possible to maintain access performance and reduce power consumption.

Fifth Embodiment

In the present embodiment, a JIT seek control method using target acceleration designation processing and VCM current indication value generation processing using a controller not considering a BEMF will be described.

FIG. 14 is a configuration diagram illustrating functions of a seek control unit according to a fifth embodiment.

A JIT seek control unit 622D is different from the JIT seek control unit 622C in FIG. 12 in that a controller 622D3 that does not include a BEMF is included instead of the BEMF consideration controller 622C3, and the BEMF coefficient acquisition unit 622C4 is not included.

FIG. 15 is a block diagram of a servo control unit according to the fifth embodiment.

The difference from FIG. 13 is that the control instruction value determination unit 622C3 becomes the controller 622D3 not including the BEMF, and the BEMF coefficient acquisition unit 622C4 is eliminated. Other configurations have functions similar to those of the configurations having the same names included in FIG. 13, and thus detailed description thereof will be omitted.

The difference from the fourth embodiment is that the designation of the target acceleration $a_{tgt}$ and the BEMF term (term of back electromotive force) in the controller as in Formula (21) are not included.

$$V_{set} = R_C i_{VCM} + L_{VCM}\frac{di_{VCM}}{dt} \quad (21)$$

The operation is equivalent to the case where the BEMF coefficient $k_{BEMF}$ of the fourth embodiment is zero.

Furthermore, similarly to the VCM current limit threshold setting unit 622A2 in the second embodiment, the VCM current limit threshold setting unit 622D2 may be used to set the upper limit of the VCM current indication value using the threshold for the target acceleration $a_{tgt}$ input to the control instruction value determination unit 622D3.

The VCM current limit threshold setting unit 622D2 uses at least one piece of information of the seek distance, the rotation waiting time, the power supply voltage $V_{sup}$, the environmental temperature, or the VCM temperature at the time of starting a seek to generate the VCM current threshold value $i_{thp}$ for the acceleration interval and the VCM current threshold value $i_{thn}$ for the deceleration interval by referring to a table in the FW or the nonvolatile memory, convert the VCM current threshold value $i_{thp}$ for the acceleration interval and the VCM current threshold value $i_{thn}$ for the deceleration interval into the acceleration threshold value $a_{thp}$ for the acceleration interval and the deceleration threshold value $a_{thn}$ for the deceleration interval by Formula (3), and set the obtained acceleration threshold value $a_{thp}$ for the acceleration interval and deceleration threshold value $a_{thn}$ for the deceleration interval to the target acceleration $a_{tgt}$, thereby adjusting the acceleration and the VCM current level in the AccFlat and DecFlat intervals. When an upper limit is set for the VCM current indication value by the threshold, there is no slope in the AccFlat and DecFlat intervals, and the VCM current indication value has a constant value.

FIG. 16 is a diagram illustrating a first example of the VCM current waveform generated by the seek control unit according to the embodiment.

FIG. 16 is an example of VCM current indication value data used in various types of JIT seek control in a case where the moving distance of the head HD (the distance from the current head HD position to the target track) and the moving time (time from start of seek of a head HD to arrival at target sector data including rotation waiting time) are the same.

A characteristic TC51 is an example of the VCM current indication value data obtained by the conventional JIT seek control, a characteristic TC52 is an example of the VCM current indication value data obtained by the JIT seek control using the BEMF coefficient of the fourth embodiment, and a characteristic TC53 is an example of the VCM current indication value data obtained by the JIT seek control including the clipping processing using the target acceleration limit processing unit 622A1 and the VCM current indication value limit processing unit 622B1 of the second and third embodiments.

The characteristic TC51 corresponds to the VCM current waveform TC112 in FIG. 5, and is obtained, for example, by lowering the acceleration voltage level with respect to the VCM current waveform of the fastest seek (TC111 in FIG. 5). For example, this is realized by reducing $V_{set}$ in the differential equation of Formula (1). More specifically, V se t is reduced by the methods described in the second, third, and fourth embodiments.

In the characteristic TC52, the inclination of the VCM current indication value data in the circuit equation control interval (from time t51 to around time t53) is made gentle as compared with the characteristic TC51, and the start of the discharge control is delayed as compared with the case of the characteristic TC51 (around time t53). In the JIT seek control using the characteristic TC52, power consumption is reduced as compared with the case of using the characteristic TC51.

Furthermore, in the characteristic TC53, the upper limit of the VCM current indication value data in the circuit equation control interval (from time t51 to around time t53) is suppressed as compared with the characteristic TC52, and the start of the discharge control is delayed as compared with the case of the characteristic TC52. In the JIT seek control using the characteristic TC53, power consumption is reduced as compared with the case of using the characteristic TC52.

FIG. 17 is a diagram illustrating a second example of the VCM current waveform generated by the seek control unit according to the embodiment.

FIG. 17 is an example of the VCM current indication value data in the JIT seek control for controlling the upper limit value of the VCM current indication value, and is different from FIG. 16 in that the moving distance of the head HD is the same but the moving time is not the same in each JIT seek control.

A characteristic TC71 is an example of the VCM current indication value data obtained by the conventional JIT seek control, a characteristic TC72 is an example of the VCM current indication value data obtained by the JIT seek control using the BEMF coefficient of the fourth embodiment, and characteristics TC73 and TC74 are examples of the VCM current indication value data obtained by the JIT seek control including the clipping processing using the target acceleration limit processing unit 622A1 and the VCM current indication value limit processing unit 622B1 of the second and third embodiments.

In the characteristic TC72, the inclination of the VCM current indication value data in the circuit equation control interval (from time t71 to around time t73) is made gentle as compared with the characteristic TC71, and the start of the discharge control is made to coincide with the case of the characteristic TC71. In this case, in the JIT seek control using the characteristic TC72, the power consumption is reduced as compared with the case of using the characteristic TC71, but the arrival time of the head HD is t771, which is later than the case of the characteristic TC71.

Furthermore, in the characteristic TC73, as compared with the characteristic TC72, the upper limit of the VCM current indication value data in the circuit equation control portion (from time t71 to around time t73) is suppressed, and the start of the discharge control is made to coincide with the case of the characteristic TC72. In the JIT seek control using the characteristic TC73, the power consumption is reduced as compared with the case of using the characteristic TC72, but the arrival time of the head HD is t772, which is later than the case of using the characteristic TC72.

Features described in the present embodiments are extracted as follows.

(A-1) A magnetic disk device that changes a shape of a VCM current (or head acceleration) in seek control according to a rotation waiting time, the magnetic disk device including in at least one of an acceleration interval and a deceleration interval, a monotonically decreasing interval of an absolute value of a VCM current (or head acceleration) in consideration of a back electromotive voltage when there is no rotation waiting time, in which an interval average value of first-order differential values of an absolute value of the VCM current (or head acceleration) is larger in a monotonically decreasing interval of an absolute value of the VCM current (or head acceleration) in consideration of the back electromotive voltage when there is a rotation waiting time than when there is no rotation waiting time.

$$ave\left(\frac{d|i_{VCM\_NoRotWait}|}{dt}\right) < ave\left(\frac{d|i_{VCM\_RotWait}|}{dt}\right) \quad (A1)$$

$$ave\left(\frac{d|i_{VCM\_NoRotWait}|}{dt}\right) < ave\left(\frac{d|i_{VCM\_RotWait}|}{dt}\right)$$

-continued $$ave\left(\frac{d|a_{VCM\_NoRotWait}|}{dt}\right) < ave\left(\frac{d|a_{VCM\_RotWait}|}{dt}\right) \quad (A2)$$

$$ave\left(\frac{d|a_{VCM\_NoRotWait}|}{dt}\right) < ave\left(\frac{d|a_{VCM\_RotWait}|}{dt}\right)$$

$$ave\left(\frac{d|a_{VCM\_NoRotWait}|}{dt}\right) < ave\left(\frac{d|a_{VCM\_RotWait}|}{dt}\right) \text{ where } ave \quad (\ )$$

is an interval average value function in a monotonically decreasing interval of an absolute value of the VCM current (or head acceleration) in consideration of the back electromotive voltage, and the following formula is established.

$$\frac{d|i_{VCM\_NoRotWait}|}{dt} \text{ and } \frac{d|a_{VCM\_NoRotWait}|}{dt}$$

$$\frac{d|i_{VCM\_NoRotWait}|}{dt} \text{ and } \frac{d|a_{VCM\_NoRotWait}|}{dt}$$

are negative values.

(A-2) The magnetic disk device according to (A-1), in which, in a monotonically decreasing interval of an absolute value of the VCM current (or head acceleration) in consideration of the back electromotive voltage when there is the rotation waiting time, an interval average value of first-order differential values of the absolute value of the VCM current (or head acceleration) is near 0.

$$ave\left(\frac{d|i_{VCM\_RotWait}|}{dt}\right) \approx 0 \quad (A12)$$

$$ave\left(\frac{d|i_{VCM\_RotWait}|}{dt}\right) \approx 0 \text{ where } ave$$

( ) is an interval average value function in a monotonically decreasing interval of an absolute value of the VCM current (or head acceleration) in consideration of the back electromotive voltage.

(A-3) The magnetic disk device according to (A-1) or (A-2), in which the monotonically decreasing interval of the absolute value of the VCM current (or head acceleration) in consideration of the back electromotive voltage in the acceleration interval has a start point at a time when the absolute value of the VCM current (or head acceleration) in the acceleration interval becomes maximum, and an end point at a time when the absolute value of the first-order derivative of the VCM current (or head acceleration) becomes maximum after the start point and before a time when a polarity of the VCM current (or head acceleration) is reversed.

(A-4) The magnetic disk device according to (A-1) or (A-2), in which the monotonically decreasing interval of the absolute value of the VCM current (or head acceleration) in consideration of the back electromotive voltage in the deceleration interval has a start point at a time when the absolute value of the VCM current (or head acceleration) in the deceleration interval becomes maximum, and an end point at a time when the absolute value of the first-order derivative of the VCM current (or head acceleration) becomes maximum after the start point and before a seek end time when the VCM current (or head acceleration) becomes close to 0.

(A-5) The magnetic disk device according to (A-1) to (A-4), in which, in the acceleration interval and the deceleration interval, a target head acceleration saturated so that an absolute value of the target head acceleration does not exceed a head acceleration limit threshold value is input to a control instruction value determination unit as a target head acceleration.

(A-6) The magnetic disk device according to (A-5), in which the target head acceleration is shaped to have a smooth waveform over time using a digital filter.

(A-7) The magnetic disk device according to (A-5) or (A-6), in which the head acceleration limit threshold has a parameter according to at least one condition of a seek distance, a rotation waiting time, a power supply voltage, and a temperature.

(A-8) The magnetic disk device according to (A-7), in which a parameter of the head acceleration limit threshold is provided on FW or a nonvolatile memory.

(A-9) The magnetic disk device according to (A-1) to (A-4), in which, in the acceleration interval and the deceleration interval, a VCM current indication value saturated by the control instruction value determination unit so that an absolute value of the VCM current indication value does not exceed a VCM current limit threshold is input to a VCM current application unit.

(A-10) The magnetic disk device according to (A-9), in which the VCM current indication value is shaped to have a smooth waveform over time using a digital filter.

(A-11) The magnetic disk device according to (A-9) or (A-10), in which the VCM current limit threshold has a parameter according to at least one condition of a seek distance, a rotation waiting time, a power supply voltage, and a temperature.

(A-12) The magnetic disk device according to (A-11), in which a parameter of the VCM current limit threshold is provided on FW or a nonvolatile memory.

(A-13) The magnetic disk device according to (A-1) to (A-4), in which in the acceleration interval, a back electromotive force value is corrected and a target head acceleration and a VCM voltage are corrected by using a back electromotive force coefficient in a circuit equation.

$$V_{set} = R_C i_{VCM} + L_{VCM}\frac{di_{VCM}}{dt} + V_{BEMF\_set} \quad (A21)$$

$$V_{BEMF\_set} = k_{BEMF} K_f v \quad (A22)$$

(A-14) The magnetic disk device according to (A-13), in which the target head acceleration and the VCM voltage have parameters according to at least one condition of a seek distance, a rotation waiting time, a power supply voltage, and a temperature.

(A-15) The magnetic disk device according to (A-14), in which parameters of the target head acceleration and the VCM voltage are provided on FW or a nonvolatile memory.

(A-16) The magnetic disk device according to (A-1) to (A-4), in which in the acceleration interval, a VCM current indication value is generated in a circuit equation that does not include a back electromotive voltage term of a control instruction value determination unit.

$$V_{set} = R_C i_{VCM} + L_{VCM}\frac{di_{VCM}}{dt} \quad (A31)$$

(A-17) The magnetic disk device according to (A-16), in which the target head acceleration and the VCM voltage have parameters according to at least one condition of a seek distance, a rotation waiting time, a power supply voltage, and a temperature.

(A-18) The magnetic disk device according to (A-17), in which parameters of the target head acceleration and the VCM voltage are provided on FW or a nonvolatile memory.

By adopting the above (A-1), it is possible to perform a seek with lower power consumption than a normal seek.

By adopting the above (A-2), the power consumption becomes equal or less.

By adopting the above (A-3), it is possible to define a change interval for reducing power consumption.

By adopting the above (A-4), it is possible to define a change interval for reducing power consumption.

By adopting the above (A-5), it is possible to generate a VCM current waveform having a slope in the vicinity of 0 in an AccFlat interval and a DecFlat interval.

By adopting the above (A-6), a VCM current waveform that hardly excites mechanical resonance can be generated.

By adopting the above (A-7), the level of the VCM current can be adjusted.

By adopting the above (A-8), the configuration of the above (A-7) can be implemented.

By adopting the above (A-9), it is possible to generate a VCM current waveform having a slope in the vicinity of 0 in the AccFlat interval and the DecFlat interval.

By adopting the above (A-10), a VCM current waveform that hardly excites mechanical resonance can be generated.

By adopting the above (A-11), the level of the VCM current can be adjusted.

By adopting the above (A-12), the configuration of the above (A-11) can be implemented.

By adopting the above (A-13), it is possible to generate a VCM current waveform having a small slope or a slope in the vicinity of 0 in the AccFlat interval and the DecFlat interval.

By adopting the above (A-14), the level of the VCM current can be adjusted.

By adopting the above (A-15), the configuration of the above (A-14) can be implemented.

By adopting the above (A-16), it is possible to generate a VCM current waveform having a slope in the vicinity of 0 in the AccFlat interval and the DecFlat interval.

By adopting the above (A-17), the level of the VCM current can be adjusted.

By adopting the above (A-18), the configuration of the above (A-17) can be implemented.

According to at least one embodiment and modification example described above, it is possible to provide a magnetic disk device that reduces power consumption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Furthermore, the processing illustrated in the flowcharts, the sequence charts, and the like may be realized by software (programs and the like) operated by hardware such as an IC chip and a digital signal processing processor (Digital Signal Processor or DSP), a computer including a microcomputer, or the like, or a combination of hardware and software. Furthermore, the device of the present invention is also applied to a case where a claim is expressed as a control logic, a case where a claim is expressed as a program including an instruction for executing a computer, and a case where a claim is expressed as a computer-readable recording medium describing the instruction. Furthermore, names and terms used are not limited, and even other expressions are included in the present invention as long as they have substantially the same content and the same purpose.

What is claimed is:

1. A magnetic disk device comprising:
a head that reads and writes a disk;
a command processing unit that receives and processes a command for instructing to read from and write to a target data sector of the disk;
a seek control unit that determines an operation acceleration of the head, generates a current indication value corresponding to the operation acceleration, and moves the head to a target track where the target data sector is located; and
a voice coil motor (VCM) that controls an operation of the head based on the current indication value,
wherein the seek control unit includes a JIT seek control unit that executes JIT seek control that causes the head to wait for rotation of the disk to perform read/write processing of the target data sector, and a fastest seek control unit that executes fastest seek control that does not consider wait for rotation of the disk,
the fastest seek control unit uses first time series data of a current indication value of a VCM having a monotonically decreasing interval in which an absolute value of a VCM current is within an applicable range in an acceleration interval and a deceleration interval of the head or an operation acceleration of the head, and
the JIT seek control unit uses second time series data of a current indication value of a VCM that sets a slope having an absolute value smaller than an absolute value of a slope of the first time series data in at least one of the monotonically decreasing interval of the acceleration interval and the monotonically decreasing interval of the deceleration interval of the head or an operation acceleration of the head.

2. The magnetic disk device according to claim 1, wherein the second time series data is provided on a non-volatile memory, or parameters necessary for generating the second time series data on firmware are provided on the non-volatile memory.

3. The magnetic disk device according to claim 1, wherein the second time series data is time series data of a current indication value of the VCM or an operation acceleration of the head including a time interval in which an average value of a first-order derivative of the current indication value of the VCM or an absolute value of the operation acceleration of the head is 0 or near.

4. The magnetic disk device according to claim 1, wherein the seek control unit includes a head acceleration limit threshold that is a threshold for the operation acceleration of the head, determines a second operation acceleration of the head so as to set the head acceleration limit threshold as an upper limit, and generates the current indication value based on the second operation acceleration.

5. The magnetic disk device according to claim 4, wherein the seek control unit generates a third operation acceleration obtained by smoothing the second operation acceleration using a digital filter, and generates the current indication value based on the third operation acceleration.

6. The magnetic disk device according to claim 4, wherein the head acceleration limit threshold has at least one of a seek distance, a rotation waiting time, a power supply voltage, and a temperature as a parameter.

7. The magnetic disk device according to claim 6, wherein a parameter of the head acceleration limit threshold is provided on firmware or a nonvolatile memory.

8. The magnetic disk device according to claim 1, wherein the seek control unit includes a VCM current limit threshold that is a threshold for the current indication value, generates a second current indication value for the VCM so as to set the VCM current limit threshold as an upper limit, and inputs the second current indication value to the VCM.

9. The magnetic disk device according to claim 8, wherein the seek control unit generate a third current indication value obtained by smoothing the second current indication value using a digital filter, and inputs the third current indication value to the VCM.

10. The magnetic disk device according to claim 8, wherein the VCM current limit threshold is determined using at least one of a seek distance, a rotation waiting time, a power supply voltage, and a temperature as a parameter.

11. The magnetic disk device according to claim 8, wherein a parameter of the VCM current limit threshold is provided in firmware or a nonvolatile memory.

12. The magnetic disk device according to claim 1, wherein based on at least a coefficient k ($0 \leq k < 1$) indicating a degree of influence of a back electromotive force, the seek control unit sets an upper limit value to a value of the current indication value for a time interval in which the back electromotive force is generated.

13. The magnetic disk device according to claim 12, wherein the coefficient k is determined using at least one of a seek distance, a rotation waiting time, a power supply voltage, and a temperature as a parameter.

* * * * *